(12) United States Patent
Nagashima et al.

(10) Patent No.: US 8,637,591 B2
(45) Date of Patent: Jan. 28, 2014

(54) WATER-BASED INK FOR INK-JET RECORDING

(75) Inventors: Shigeki Nagashima, Wakayama (JP); Hirotaka Takeno, Wakayama (JP); Yuki Wakabayashi, Wakayama (JP); Koji Azuma, Wakayama (JP)

(73) Assignee: Kao Corporation, Tokyo (JP)

( * ) Notice: Subject to any disclaimer, the term of this patent is extended or adjusted under 35 U.S.C. 154(b) by 450 days.

(21) Appl. No.: 12/678,456

(22) PCT Filed: Sep. 17, 2008

(86) PCT No.: PCT/JP2008/066777
§ 371 (c)(1),
(2), (4) Date: Mar. 16, 2010

(87) PCT Pub. No.: WO2009/038098
PCT Pub. Date: Mar. 26, 2009

(65) Prior Publication Data
US 2010/0216937 A1     Aug. 26, 2010

(30) Foreign Application Priority Data

Sep. 20, 2007  (JP) ................................ 2007-243531
Jul. 7, 2008   (JP) ................................ 2008-176963

(51) Int. Cl.
*C09D 11/02* (2006.01)

(52) U.S. Cl.
USPC ........... 523/160; 523/161; 524/558; 524/556; 524/559

(58) Field of Classification Search
USPC ................................. 523/160, 161
See application file for complete search history.

(56) References Cited

U.S. PATENT DOCUMENTS

| | | |
|---|---|---|
| 6,758,559 B1 | 7/2004 | Nakano et al. |
| 2002/0006982 A1 | 1/2002 | Kurabayashi |
| 2003/0195274 A1 | 10/2003 | Nakamura et al. |
| 2004/0229974 A1 | 11/2004 | Miyabayashi |
| 2005/0190244 A1* | 9/2005 | Tyrell ........................ 347/100 |
| 2007/0037901 A1* | 2/2007 | Kanaya et al. ............. 523/160 |
| 2009/0220693 A1 | 9/2009 | Takemura et al. |
| 2011/0092637 A1 | 4/2011 | Tanaka et al. |

FOREIGN PATENT DOCUMENTS

| | | |
|---|---|---|
| EP | 1 088 860 A1 | 4/2001 |
| JP | 11-140343 A | 5/1999 |
| JP | 11-343439 A | 12/1999 |
| JP | 2000-191967 A | 7/2000 |
| JP | 2001-123097 A | 5/2001 |
| JP | 2001-164158 A | 6/2001 |
| JP | 2003-306611 A | 10/2003 |
| JP | 2005-97518 A | 4/2005 |
| JP | 2007-314784 A | 12/2007 |
| JP | 2008-88427 A | 4/2008 |
| JP | 2008-150535 A | 7/2008 |

OTHER PUBLICATIONS

Office Action in Chinese Application No. 200880107679.7, dated Feb. 24, 2012, including an English translation.
Office Action for Japanese Application No. 2008-238155, dated Sep. 10, 2013.

* cited by examiner

*Primary Examiner* — Doris Lee
(74) *Attorney, Agent, or Firm* — Birch, Stewart, Kolasch & Birch, LLP

(57) ABSTRACT

The present invention relates to a water dispersion for ink-jet printing including two kinds of carbon blacks (a) and (b) and a water-insoluble polymer which adheres to a surface of the respective carbon blacks (a) and (b), wherein the carbon black (a) has an acid group content of from 0 to 200 µmol/g and the carbon black (b) has an acid group content of more than 200 µmol/g but not more than 1000 µmol/g, and a difference between acid group contents of the carbon blacks (a) and (b) is from 100 to 1000 µmol/g, and a water-based ink for ink-jet printing which contains the water dispersion. The water-based ink is excellent in image density, fixing property, high lighter fastness, image uniformity, ejection reliability and storage stability.

23 Claims, No Drawings

WATER-BASED INK FOR INK-JET RECORDING

FIELD OF THE INVENTION

The present invention relates to water dispersions and water-based inks for ink-jet printing.

BACKGROUND OF THE INVENTION

In ink-jet printing methods, droplets of ink are directly projected onto a recording medium from very fine nozzles and allowed to adhere to the recording medium, to form characters and image. The ink-jet printing methods have been rapidly spread because of their various advantages such as easiness of full coloration, low costs, capability of using plain paper as the recording medium, non-contact with printed images and characters, etc. Among such printing methods, in particular, in view of enhancing the weather resistance and water resistance of printed images and characters, an ink-jet printing method utilizing an ink containing a pigment as the colorant has now come to dominate.

For example, WO 00/39226 discloses a water-based ink containing a pigment-containing vinyl polymer which is in the form of a graft polymer obtained from a macromer to achieve a high image density.

JP 11-343439A discloses an ink containing a resin enclosing a colorant and a self-dispersible pigment on a surface of which at least one hydrophilic group is bonded directly or through any other atom group.

JP 2005-42005A discloses an ink formed by dispersing water-insoluble vinyl polymer particles containing carbon black in water in which the carbon black has a DBP oil absorption of 100 mL/100 g or higher and the water-insoluble vinyl polymer contains a salt-forming group.

JP 2003-231831A discloses a water-based ink using a water dispersion of particles of a water-insoluble polymer having an acid value of from 60 to 200 KOH mg/g and containing an acid group from 30 to 80 mol % of which is neutralized, and carbon black having a pH of from 1 to 6 which is incorporated in the polymer particles.

JP 2005-42098A discloses a water-based ink for ink-jet printing containing a water dispersion of water-insoluble vinyl polymer particles containing carbon black in which the carbon black contains volatile components in an amount of 5% or less as measured at 950° C. and is composed of two or more kinds of carbon blacks which are different in at least one of a primary particle diameter, a specific surface area and a DBP oil absorption from each other.

JP 2006-111691A discloses a water dispersion for ink-jet printing which contains carbon black having a pH of from 1 to 5 and carbon black having a pH of from 7 to 11.

However, the inks described in JP 2005-42098A and JP 2006-111691A tend to suffer from problems of poor storage stability such as change in viscosity of the inks with time provably owing to difference in surface properties between the respective carbon blacks used therein. In addition, these polymer-containing inks still have such an unsolved problem that the inks tend to be deteriorated in ejection property owing to increase in amount of the inks deposited on an ink nozzle plate.

JP 2001-207104A discloses a dispersion of an aqueous pigment which contains one kind of carbon black and an anionic group-containing polymer compound having a crosslinked moiety. However, since the polymer compound itself contains a crosslinking group, it is difficult to attain a sufficient crosslinking density of the polymer compound. Therefore, the dispersion tends to be still unsatisfactory in not only storage stability but also image density.

SUMMARY OF THE INVENTION

The present invention relates to a water-based ink for ink-jet printing which is excellent in image density, fixing property, high lighter fastness, image uniformity, ejection reliability and storage stability, and a water dispersion used in the water-based ink.

The present inventors have found that the above problems can be solved by a water dispersion of water-insoluble polymer particles containing two kinds of carbon blacks each having a specific acid group.

Thus, the present invention relates to the water dispersions and the water-based ink according to the following aspects (1) to (4).

(1) A water dispersion for ink-jet printing (hereinafter occasionally referred to merely as a "first water dispersion") including two kinds of carbon blacks (a) and (b) and a water-insoluble polymer which adheres to a surface of the respective carbon blacks (a) and (b), wherein the carbon black (a) has an acid group content of from 0 to 200 µmol/g and the carbon black (b) has an acid group content of more than 200 µmol/g but not more than 1000 µmol/g, and a difference between acid group contents of the carbon blacks (a) and (b) is from 100 to 1000 µmol/g.

(2) A water dispersion for ink-jet printing (hereinafter occasionally referred to merely as a "second water dispersion") including two kinds of carbon blacks (a) and (b) and a water-insoluble polymer, wherein a crosslinked water-insoluble polymer adheres to a surface of the respective carbon blacks (a) and (b), and wherein the carbon black (a) has an acid group content of from 0 to 200 µmol/g and the carbon black (b) has an acid group content of more than 200 µmol/g but not more than 1000 µmol/g, and a difference between acid group contents of the carbon blacks (a) and (b) is from 100 to 1000 µmol/g.

(3) A water dispersion for ink-jet printing which is produced by a process including the following steps I and II:

Step I: dispersing a mixture containing a water-insoluble polymer, carbon black (a) having an acid group content of from 0 to 200 µmol/g, carbon black (b) having an acid group content of more than 200 µmol/g but not more than 1000 µmol/g, an organic solvent and water, in which a difference between acid group contents of the carbon blacks (a) and (b) is from 100 to 1000 µmol/g, to obtain a dispersion; and Step II: removing the organic solvent from the dispersion obtained in the step I to obtain a water dispersion.

(4) A water-based ink for ink-jet printing including the water dispersion as defined in any one of the aspects (1) to (3).

DETAILED DESCRIPTION OF THE INVENTION

[Carbon Blacks]

In each of the first water dispersion and the second water dispersion, two kinds of carbon blacks which are different in acid group content from each other and a water-insoluble polymer are used to form stable fine particles of the carbon blacks in an ink.

One kind of carbon black is carbon black (a) having an acid group content of from 0 to 200 µmol/g (hereinafter occasionally referred to merely as "carbon black (a)"), and the other kind of carbon black is carbon black (b) having an acid group content of more than 200 µmol/g but not more than 1000 µmol/g (hereinafter occasionally referred to merely as "carbon black (b)"). The difference between acid group contents of the carbon black (a) and the carbon black (b) is from 100 to 1000 μmol/g.

The carbon black (a) has a small acid group content and is more likely to be incorporated in polymer particles. Therefore, the carbon black (a) is generally excellent in fixing property and high lighter fastness. Whereas, the carbon black (b) has a large acid group content and is more likely to be aggregated on a print. Therefore, the carbon black (b) provides an excellent image density.

In the present invention, by using both the carbon blacks (a) and (b), it is possible to improve not only a fixing property, a high lighter fastness and an image density but also an ejection reliability, a storage stability and an image uniformity. These effects are synergistically enhanced by dispersing the carbon blacks (a) and (b) at the same time.

The acid group content of the carbon black (a) is from 0 to 200 μmol/g from the above viewpoints, preferably from 0 to 100 μmol/g and more preferably from 0 to 50 μmol/g.

When using two or more carbon blacks as the carbon black (a), the acid group content of the carbon black (a) is determined as an average value of acid group contents of the respective carbon blacks which are calculated according to weight ratios of the respective carbon blacks.

The acid group content of the carbon black (b) is more than 200 μmol/g but not more than 1000 μmol/g from the above viewpoints, preferably from 200 to 900 μmol/g and more preferably from 300 to 900 μmol/g.

When using two or more carbon blacks as the carbon black (b), the acid group content of the carbon black (b) is determined as an average value of acid group contents of the respective carbon blacks which are calculated according to weight ratios of the respective carbon blacks.

The difference between acid group contents of the carbon black (a) and the carbon black (b) is from 100 to 1000 μmol/g from the viewpoint of effectively exhibiting the above synergistic effects of both the carbon blacks (a) and (b). The lower limit of the difference between acid group contents of the carbon black (a) and the carbon black (b) is preferably 200 μmol/g or more, more preferably 300 μmol/g or more, still more preferably 400 μmol/g or more, and further still more preferably 500 μmol/g or more.

When using two or more carbon blacks as each of the carbon black (a) and the carbon black (b), the difference between acid group contents of the carbon black (a) and the carbon black (b) is determined as a difference between an average value of acid group contents of the two or more carbon blacks used as the carbon black (a) and an average value of acid group contents of the two or more carbon blacks used as the carbon black (b) in which the acid group contents of the respective carbon blacks are calculated according to weight ratios thereof.

As the acid group, any optional acid groups may be used as long as they have a high hydrophilic property to an extent sufficient to stably disperse the carbon blacks in an aqueous medium. Specific examples of the acid group include a carboxylate group ($-COOM^1$), a sulfonate group ($-SO_3M^1$), a phosphate group ($-PO_3M^1{}_2$), $-PO_3HM^1$, $-SO_2M^1$, $-SO_2NH_2$, $-SO_2NHCOR^1$ and dissociated ions of these acid groups (such as $-COO-$, $-SO_3-$, $-PO_3{}^{2-}$ and $-PO_3-H$). These acid groups may be contained in the respective carbon blacks alone or in combination of any two or more thereof.

In the above chemical formulae of the respective acid groups, $M^1$ may be the same or different. Examples of $M^1$ include a hydrogen atom; alkali metals such as lithium, sodium and potassium; alkali earth metals; an ammonium group; a monomethyl ammonium group, a dimethyl ammonium group and a trimethyl ammonium group; a monoethyl ammonium group, a diethyl ammonium group and a triethyl ammonium group; and other organic ammonium groups such as a monomethanol ammonium group, a dimethanol ammonium group and a trimethanol ammonium group.

$R^1$ is an alkyl group having 1 to 12 carbon atoms, a substituted or unsubstituted phenyl group or a substituted or unsubstituted naphthyl group. Among these acid groups, from the viewpoint of a good dispersion stability in an ink, preferred are a carboxylate group ($-COOM^1$) and a sulfonate group ($-SO_3M^1$).

The measurement of the acid group content may be carried out by the method described below in the Examples.

The weight ratio of the carbon black (a) to the carbon black (b) [carbon black (a)/carbon black (b)] is preferably from 10/90 to 90/10, more preferably from 10/90 to 50/50 and still more preferably from 10/90 to 40/60 from the viewpoint of effectively exhibiting the synergistic effects of both the carbon blacks.

The DBP (dibutyl phthalate) oil absorption of the carbon black (a) is preferably from 20 to 200 mL/100 g, more preferably from 30 to 150 mL/100 g and still more preferably from 50 to 110 mL/100 g from the viewpoint of enhanced affinity to the carbon black (b). The DBP oil absorption of the carbon black has a positive correlation with a bulkiness thereof. When the DBP oil absorption lies within the above specified range, the carbon black (a) exhibits a high affinity with the carbon black (b), resulting in good image density and storage stability of the resulting ink.

Meanwhile, the DBP oil absorption is the value measured according to ISO 1126 (JIS K6217-4).

The carbon blacks may include furnace blacks (including high-color furnace blacks and medium-color furnace blacks), thermal lamp blacks, acetylene blacks and channel blacks. The carbon blacks may be oxidized by a vapor phase or liquid phase oxidation method using an oxidizing agent such as ozone, nitric acid, hydrogen peroxide and nitrogen oxides or a surface-modifying method such as plasma treatment.

Specific examples of commercially available products of the carbon black (a) include "MONARCH 800" (acid group content: 0 μmol/g; DBP oil absorption: 68 mL/100 g; the "DBP oil absorption" is hereinlater referred to merely as "oil absorption"), "MONARCH 900" (acid group content: 0 μmol/g; oil absorption: 64 mL/100 g), "MONARCH 880" (acid group content: 0 μmol/g; oil absorption: 105 mL/100 g), "MONARCH 1100" (acid group content: 0 μmol/g; oil absorption: 50 mL/100 g), "REGAL 330R" (acid group content: 0 μmol/g; oil absorption: 71 mL/100 g) and "REGAL 415R" (acid group content: 0 μmol/g; oil absorption: 52 mL/100 g) all available from Cabot Corp.; "NIPex 85" (acid group content: 0 μmol/g; oil absorption: 48 mL/100 g), "NIPex 75" (acid group content: 0 μmol/g; oil absorption: 49 mL/100 g), "NIPex 70" (acid group content: 0 μmol/g; oil absorption: 123 mL/100 g), "Printex 35" (acid group content: 0 μmol/g; oil absorption: 42 mL/100 g), "Printex 55" (acid group content: 0 μmol/g; oil absorption: 46 mL/100 g), "Printex 75" (acid group content: 0 μmol/g; oil absorption: 49 mL/100 g), "Printex 85" (acid group content: 0 μmol/g; oil absorption: 48 mL/100 g), "S-160" (acid group content: 57 μmol/g; oil absorption: 150 mL/100 g) and "FW1" (acid group content: 114 μmol/g; oil absorption: 170 mL/100 g) all available from Degussa AG.; "#85" (acid group content: 0 μmol/g; oil absorption: 56 mL/100 g), "#2600" (acid group content: 0 μmol/g; oil absorption: 77 mL/100 g), "#45L" (acid group content: 0 μmol/g; oil absorption: 45 mL/100 g) and "MCF88" (acid group content: 0 μmol/g; oil absorption: 55 mL/100 g) all available from Mitsubishi Chemical Corp.; and "Reven 2000" (acid group content: 0 µmol/g; oil absorption: 70 mL/100 g) and "Reven 1500" (acid group content: 0 µmol/g; oil absorption: 65 mL/100 g) both available from Columbian Carbon Japan Ltd.

Among the above commercially available carbon blacks, especially preferred are "MONARCH 800" (acid group content: 0 µmol/g; oil absorption: 68 mL/100 g) and "MONARCH 880" (acid group content: 0 µmol/g; oil absorption: 105 mL/100 g) both available from Cabot Corp., and "NIPex 80" (acid group content: 0 µmol/g; oil absorption: 100 mL/100 g) and "NIPex 70" (acid group content: 0 µmol/g; oil absorption: 123 mL/100 g) both available from Degussa AG.

The carbon black (b) is preferably a so-called self-dispersible carbon black from the viewpoint of a high dispersion stability. The "self-dispersible carbon black" as used herein means carbon black onto a surface of which one or more anionic hydrophilic functional groups are bonded either directly or through the other atom group to thereby render the carbon black dispersible in an aqueous medium without using a surfactant or a resin. The "dispersible" means such a condition that the carbon black is stably dispersed in water (25° C.; solid content: 10%) for 30 days without using any dispersant and without observing any precipitates by naked eyes. Examples of the other atom group include an alkanediyl group having 1 to 24 carbon atoms and preferably 1 to 12 carbon atoms, a substituted or unsubstituted phenylene group and a substituted or unsubstituted naphthylene group.

Examples of the anionic hydrophilic functional groups include the acid groups described above.

In order to render the carbon black self-dispersible, a necessary amount of the above anionic hydrophilic functional group may be chemically bonded to a surface of the carbon black. The anionic hydrophilic functional group may be bonded to the surface of the carbon black by any optional known method, for example, by the methods described in U.S. Pat. Nos. 5,571,311, 5,630,868 and 5,707,432; J. E. Johnson, "Imaging Science and Technology's 50th Annual Conference (1997)"; Yuan Yu, "Imaging Science and Technology's 53rd Annual Conference (2000)"; and "Polyfile", 1248 (1996).

More specifically, there may be used the method of introducing a carboxyl group into carbon black using an oxidizing agent, e.g., acids having an oxidizing property such as nitric acid, sulfuric acid, persulfuric acid, peroxodisulfuric acid, hypochlorous acid and chromic acid and salts of these acids, and hydrogen peroxide, nitrogen oxides and ozone; the method of introducing a sulfone group into carbon black by thermal decomposition of persulfate compounds; the method of introducing the above acid group or groups into carbon black using diazonium compounds containing a carboxyl group or a sulfone group; or the like. Among these methods, from the viewpoint of a good image density, the liquid phase oxidation method using the acids having an oxidizing property is preferably used.

The volatile content of the carbon black (b) is preferably more than 5% and more preferably 6% or more from the viewpoint of a good image density and a synergistic effects of the carbon black (b) with the carbon black (a). The volatile content of the carbon black (b) is the value measured by heating the carbon black (b) at 950° C. for 7 min (according to ASTM D1620-60).

Specific examples of commercially available products of the carbon black (b) include "CAB-O-JET 200" and "CAB-O-JET 300" both available from Cabot Corp., "BONJET CW-1" (acid group content: 470 µmol/g) and "BONJET CW-2" both available from Orient Chemical Industries Co., Ltd., and "Aqua-Black 162" available from Tokai Carbon Co., Ltd.

[Water-Insoluble Polymer]

The water-insoluble polymer used in the present invention preferably exhibits a solubility in water of 10 g or less, more preferably 5 g or less and still more preferably 1 g or less when the polymer is dried at 105° C. for 2 h and then dissolved in 100 g of water at 25° C. The solubility means a solubility in water of the water-insoluble polymer whose salt-forming groups are completely (100%) neutralized with acetic acid or sodium hydroxide according to kinds of the salt-forming groups to be neutralized.

The water-insoluble vinyl polymer used in the present invention is preferably a graft polymer which is produced by copolymerizing a mixture containing (a) a salt-forming group-containing monomer (hereinafter occasionally referred to merely as a "component (a)"), (b) a macromer (hereinafter occasionally referred to merely as a "component (b)"), and (c) a monomer containing a straight-chain or branched alkyl group or alkenyl group having 12 to 22 carbon atoms (hereinafter occasionally referred to merely as a "component (c)") and/or (d) an aromatic ring-containing monomer (hereinafter occasionally referred to merely as a "component (d)") (the mixture of these monomers is hereinafter occasionally referred to merely as a "monomer mixture"). The graft polymer contains a constitutional unit derived from the component (a), a constitutional unit derived from the component (b), and a constitutional unit derived from the component (c) and/or a constitutional unit derived from the component (d). The more preferred polymer is a graft polymer containing a constitutional unit derived from the component (a) as well as a constitutional unit derived from the component (c) and/or a constitutional unit derived from the component (d) in a main chain thereof, and a constitutional unit derived from the component (b) in a side chain thereof.

(Salt-Forming Group-Containing Monomer (a))

The salt-forming group-containing monomer (a) is used for enhancing a dispersion stability of the resultant water dispersion. Examples of the salt-forming group include a carboxyl group, a sulfonic group, a phosphoric group, an amino group and an ammonium group. Among these groups, preferred is a carboxyl group.

Examples of the salt-forming group-containing monomer (a) includes cationic monomers, anionic monomers and the like which are described in paragraph [0022] of JP 9-286939A, etc.

Typical examples of the cationic monomers include unsaturated amine group-containing monomers and unsaturated ammonium salt group-containing monomers. Among these cationic monomers, preferred are N,N-dimethylaminoethyl (meth)acrylate, N-(N',N'-dimethylaminopropyl) (meth)acrylamide and vinyl pyrrolidone.

Typical examples of the anionic monomers include unsaturated carboxylic acid monomers, unsaturated sulfonic acid monomers and unsaturated phosphoric acid monomers.

Examples of the unsaturated carboxylic acid monomers include acrylic acid, methacrylic acid, crotonic acid, itaconic acid, maleic acid, fumaric acid, citraconic acid and 2-methacryloyloxymethylsuccinic acid. Examples of the unsaturated sulfonic acid monomers include styrenesulfonic acid, 2-acrylamido-2-methylpropanesulfonic acid, 3-sulfopropyl (meth)acrylate and bis(3-sulfopropyl)itaconic ester. Examples of the unsaturated phosphoric acid monomers include vinylphosphonic acid, vinyl phosphate, bis(meth)acryloxyethyl)phosphate, diphenyl-2-acryloyloxyethyl phosphate, diphenyl-2-methacryloyloxyethyl phosphate and dibutyl-2-acryloyloxyethyl phosphate.

Among the above anionic monomers, in view of a good dispersion stability and a good ejecting stability of the resultant inks, preferred are the unsaturated carboxylic acid monomers, and more preferred are acrylic acid and methacrylic acid.

(Macromer (b))

The macromer (b) is used for enhancing a dispersion stability of the polymer particles containing the carbon blacks. The macromer (b) is in the form of a monomer containing a polymerizable unsaturated group which has a number-average molecular weight of from 500 to 100,000 and preferably from 1,000 to 10,000. The number-average molecular weight of the macromer (b) may be measured by gel permeation chromatography using "G4000HXL+G2000HXL" available from Toso Corp., as a column and tetrahydrofuran (THF) containing 50 mM of $CH_3COOH$ (extra pure reagent) as an eluent, in terms of polystyrene as a standard substance.

Among these macromers (b), in view of a good dispersion stability of the polymer particles, etc., preferred are styrene-based macromers and aromatic group-containing (meth)acrylate-based macromers which have a polymerizable functional group at one terminal end thereof.

Examples of the styrene-based macromer include homopolymers of styrene-based monomers, and copolymers of the styrene-based monomers with other monomers. Examples of the styrene-based monomers include styrene, 2-methyl styrene, vinyl toluene, ethylvinyl benzene, vinyl naphthalene and chlorostyrene.

As the aromatic group-containing (meth)acrylate-based macromers, there are preferably used homopolymers of an aromatic group-containing (meth)acrylate and copolymers of the aromatic group-containing (meth)acrylate with other monomers. Examples of the aromatic group-containing (meth)acrylate include (meth)acrylates containing an arylalkyl group having 7 to 22 carbon atoms, preferably 7 to 18 carbon atoms and more preferably 7 to 12 carbon atoms which may have a substituent group containing a hetero atom, and (meth)acrylates containing an aryl group having 6 to 22 carbon atoms, preferably 6 to 18 carbon atoms and more preferably 6 to 12 carbon atoms which may have a substituent group containing a hetero atom. Examples of the substituent group containing a hetero atom include a halogen atom, an ester group, an ether group and a hydroxyl group. Specific examples of the aromatic group-containing (meth)acrylate include benzyl (meth)acrylate, phenoxyethyl (meth)acrylate, 2-hydroxy-3-phenoxypropyl acrylate and 2-methacryloyloxyethyl-2-hydroxypropyl phthalate. Among these aromatic group-containing (meth)acrylates, preferred is benzyl (meth)acrylate.

The polymerizable functional group bonded to one terminal end of these macromers is preferably an acryloyloxy group or a methacryloyloxy group. Examples of the preferred other monomers copolymerizable with the aromatic group-containing (meth)acrylate include acrylonitrile.

The content of the constitutional unit derived from the styrene-based monomer in the styrene-based macromer or the constitutional unit derived from the aromatic group-containing (meth)acrylate in the aromatic group-containing (meth)acrylate-based macromer is preferably 50% by weight or higher and more preferably 70% by weight or higher in view of enhancing an affinity to the carbon blacks.

The macromer (b) may further contain a chain composed of the other constitutional unit derived from an organopolysiloxane, etc. Such a chain may be produced, for example, by copolymerizing the macromer (b) with a silicone-based macromer having a polymerizable functional group at one terminal end thereof which is represented by the following formula (1):

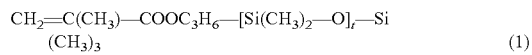

$$CH_2=C(CH_3)-COOC_3H_6-[Si(CH_3)_2-O]_t-Si(CH_3)_3 \quad (1)$$

wherein t is a number from 8 to 40.

The styrene-based macromer as the component (b) is commercially available, for example, from Toagosei Co., Ltd., as product names of AS-6(S), AN-6(S), HS-6(S), etc.

(Alkyl Group- or Alkenyl Group-Containing Monomer (c))

The monomer (c) containing a straight-chain or branched alkyl group or alkenyl group having 12 to 22 carbon atoms may be used for enhancing a storage stability, an image density and an image uniformity. The component (c) is preferably an alkyl (meth)acrylate having an alkyl group having 12 to 22 carbon atoms which is represented by the following formula (2).

$$CH_2=CHR^2COOR^3 \quad (2)$$

wherein $R^2$ is a hydrogen atom or a methyl group; and $R^3$ is a straight-chain or branched alkyl group or alkenyl group having 12 to 22 carbon atoms.

In the formula (2), $R^3$ is preferably a straight-chain or branched alkyl group or alkenyl group having 14 to 20 carbon atoms.

Examples of the suitable component (c) include (iso)dodecyl (meth)acrylate, (iso)tetradecyl (meth)acrylate, (iso)palmityl (meth)acrylate and (iso)stearyl (meth)acrylate.

Meanwhile, the term "(iso-)" as used herein means both the structure in which the group expressed by "iso" is present, and the structure in which the group is not present, i.e., normal, and the term "(meth)acrylate" means acrylate, methacrylate and both thereof.

(Aromatic Ring-Containing Monomer (d))

The monomer mixture may also contain an aromatic ring-containing monomer (d) from the viewpoint of enhancing an image density and an image uniformity. The component (d) is preferably an aromatic ring-containing monomer having 6 to 22 carbon atoms.

As the suitable component (d), there is preferably used a vinyl monomer containing an aromatic group having 6 to 22 carbon atoms, preferably 6 to 18 carbon atoms and more preferably 6 to 12 carbon atoms which may also contain a substituent group having a hetero atom. Examples of the component (d) include the above styrene-based monomer (component d-1), and the above aromatic group-containing (meth)acrylate (component d-2). Examples of the substituent group having a hetero atom include those exemplified previously.

Among these components (d), in view of enhancing an image density, preferred is the styrene-based monomer (component d-1). Among the styrene-based monomers (component d-1), especially preferred are styrene and 2-methyl styrene. The content of the component (d-1) in the component (d) is preferably from 10 to 100% by weight and more preferably from 20 to 80% by weight in view of enhancing an image density.

Also, examples of the preferred aromatic group-containing (meth)acrylate as the component (d-2) include benzyl (meth)acrylate and phenoxyethyl (meth)acrylate. The content of the component (d-2) in the component (d) is preferably from 10 to 100% by weight and more preferably from 20 to 80% by weight in view of enhancing an image density and a gloss.

Further, the components (d-1) and (d-2) are preferably used in combination with each other.

(Hydroxyl Group-Containing Monomer (e))

The monomer mixture may further contain (e) a hydroxyl group-containing monomer (hereinafter occasionally referred to merely as a "component (e)"). The hydroxyl group-containing monomer (e) is used in order to exhibit an excellent effect of enhancing a dispersion stability.

Examples of the component (e) include 2-hydroxyethyl (meth)acrylate, 3-hydroxypropyl (meth)acrylate, polyethylene glycol (n=2 to 30 wherein n represents an average molar number of addition of oxyalkylene groups: this definition is similarly applied to the following descriptions) (meth) acrylate, polypropylene glycol (n=2 to 30) (meth)acrylate, and poly(ethylene glycol (n=1 to 15)/propylene glycol (n=1 to 15) (meth)acrylate. Among these hydroxyl group-containing monomers, preferred are 2-hydroxyethyl (meth)acrylate, polyethylene glycol monomethacrylate and polypropylene glycol methacrylate.

(Monomer (f))

The monomer mixture may further contain (f) a monomer represented by the following formula (3) (hereinafter occasionally referred to merely as a "component (f)"):

wherein $R^4$ is a hydrogen atom or a lower alkyl group having 1 to 5 carbon atoms; $R^5$ is a divalent hydrocarbon group having 1 to 30 carbon atoms which may contain a hetero atom; $R^6$ is a monovalent hydrocarbon group having 1 to 11 carbon atoms which may contain a hetero atom, or an aryl group which may contain an alkyl group having 1 to 8 carbon atoms; and q represents an average molar number of addition of $R^5O$ groups, and is a number of from 1 to 60 and preferably a number of from 1 to 30.

The component (f) is used in order to exhibit an excellent effect of enhancing an ejection property of the resultant ink.

Examples of the hetero atom contained in the component (f) of the formula (3) include a nitrogen atom, an oxygen atom, a halogen atom and a sulfur atom.

Examples of the suitable $R^4$ group include methyl, ethyl and (iso)propyl.

Examples of the suitable $R^5O$ group include oxyethylene, oxytrimethylene, oxypropane-1,2-diyl, oxytetramethylene, oxyheptamethylene, oxyhexamethylene, and an oxyalkanediyl (oxyalkylene) group having 2 to 7 carbon atoms which is constituted from combination of at least two of these groups.

Examples of the suitable $R^6$ group include an aliphatic alkyl group having 1 to 10 carbon atoms and preferably 1 to 8 carbon atoms, a phenyl group and a benzyl group.

Specific examples of the component (f) include methoxy polyethylene glycol (q in the formula (3): 1 to 30; this definition is similarly applied to the following compounds) (meth)acrylate, methoxy polytetramethylene glycol (q=1 to 30) (meth)acrylate, ethoxy polyethylene glycol (q=1 to 30) (meth)acrylate, octoxy polyethylene glycol (q=1 to 30) (meth)acrylate, polyethylene glycol (q=1 to 30) (meth)acrylate 2-ethylhexyl ether, (iso)propoxy polyethylene glycol (q=1 to 30) (meth)acrylate, butoxy polyethylene glycol (q=1 to 30) (meth)acrylate, methoxy polypropylene glycol (q=1 to 30) (meth)acrylate, and methoxy (ethylene glycol/propylene glycol copolymer) (q=1 to 30: among which the number of ethylene glycol constitutional units is 1 to 29) (meth)acrylate. Among these compounds, preferred are octoxy polyethylene glycol (q=1 to 30) (meth)acrylate and polyethylene glycol (q=1 to 30) (meth)acrylate 2-ethylhexyl ether.

Specific examples of the commercially available components (e) and (f) include acrylate monomers (NK esters) available from Shin-Nakamura Kagaku Kogyo Co., Ltd., such as "M-40G", "M-90G" and "M-230G"; and BLEMMER Series available from NOF Corporation, such as "PE-90", "PE-200", "PE-350", "PME-100", "PME-200", "PME-400", "PME-1000", "PP-500", "PP-800", "PP-1000", "AP-150", "AP-400", "AP-550", "AP-800", "50PEP-300", "50POEP-800B" and "43PAPE-600B".

These components (a) to (f) may be respectively used alone or in the form of a mixture of any two or more thereof.

Upon production of the water-insoluble polymer, the contents of the above components (a) to (f) in the monomer mixture (contents of non-neutralized components; this definition is similarly applied to the following descriptions) or the contents of the constitutional units derived from the components (a) to (f) in the obtained polymer are as follows.

The content of the component (a) is preferably from 2 to 40% by weight, more preferably from 2 to 30% by weight and still more preferably from 3 to 20% by weight in view of a good dispersion stability of the resultant dispersion.

The content of the component (b) is preferably from 1 to 25% by weight and more preferably from 5 to 20% by weight, in particular, in view of enhancing an interaction with a colorant.

The content of the component (c) is preferably from 10 to 70% by weight and more preferably from 10 to 60% by weight in view of enhancing a storage stability, an image density and an image uniformity.

The content of the component (d) is preferably from 2 to 70% by weight and more preferably from 3 to 60% by weight in view of enhancing an image density and an image uniformity.

The content of the component (e) is preferably from 5 to 40% by weight and more preferably from 7 to 20% by weight in view of a good dispersion stability of the resultant dispersion.

The content of the component (f) is preferably from 5 to 50% by weight and more preferably from 10 to 40% by weight in view of a good ejection property of the resultant ink.

The total content of the components (c) and (d) [(c)+(d)] in the monomer mixture is preferably from 10 to 80% by weight, more preferably from 20 to 70% by weight and still more preferably from 30 to 60% by weight in view of enhancing an image density and an image uniformity.

The total content of the components (a), (e) and (f) [(a)+(e)+(f)] in the monomer mixture is preferably from 6 to 60% by weight and more preferably from 7 to 50% by weight in view of a good dispersion stability of the resultant dispersion and a good ejection property of the resultant ink.

Also, the weight ratio of the component (a) to a sum of the components (b), (c) and (d) [(a)/{(b)+(c)+(d)}] is preferably from 0.05 to 1, more preferably from 0.08 to 0.67 and still more preferably from 0.1 to 0.5 in view of a good dispersion stability of the resultant dispersion and a good image density.

[Production of Water-Insoluble Polymer]

The water-insoluble polymer may be produced by copolymerizing the monomer mixture by known methods such as bulk polymerization, solution polymerization, suspension polymerization and emulsion polymerization. Among these polymerization methods, preferred is the solution polymerization.

The solvent used in the solution polymerization method is preferably an organic polar solvent, although not particularly limited thereto. The organic polar solvent miscible with water may be used in the form of a mixture with water. Examples of the organic polar solvents include aliphatic alcohols having from 1 to 3 carbon atoms such as methanol, ethanol and propanol; ketones such as acetone and methyl ethyl ketone; and esters such as ethyl acetate. Among these solvents, preferred are methanol, ethanol, acetone, methyl ethyl ketone and mixed solvents of at least one thereof with water.

The polymerization may be carried out in the presence of a conventionally known radical polymerization initiator, e.g., azo compounds such as 2,2'-azobisisobutyronitrile and 2,2'-azobis(2,4-dimethylvaleronitrile), and organic peroxides such as t-butyl peroxyoctoate and dibenzoyl oxide.

The amount of the radical polymerization initiator to be used in the polymerization is preferably from 0.001 to 5 mol and more preferably from 0.01 to 2 mol per 1 mol of the monomer mixture.

The polymerization may also be carried out in the presence of a conventionally known chain transfer agent, e.g., mercaptans such as octyl mercaptan and 2-mercapto ethanol, and thiuram disulfides.

The polymerization conditions of the monomer mixture vary depending upon the kinds of the radical polymerization initiator, monomers and solvent, etc., to be used in the polymerization, and therefore are not particularly limited. The polymerization is generally conducted at a temperature of preferably from 30 to 100° C. and more preferably from 50 to 80° C. for 1 to 20 h. Further, the polymerization is preferably conducted in an atmosphere of an inert gas such as nitrogen and argon.

After completion of the polymerization reaction, the polymer thus produced may be isolated from the reaction solution by a known method such as reprecipitation and removal of solvent by distillation. The thus obtained polymer may be purified by repeated reprecipitation, membrane separation, chromatography, extraction, etc., for removing unreacted monomers, etc., therefrom.

The weight-average molecular weight of the polymer used in the present invention is preferably from 5,000 to 500,000, more preferably from 10,000 to 400,000, still more preferably from 10,000 to 300,000 and further still more preferably from 20,000 to 300,000 in view of a good image density, a good gloss and a good dispersion stability of the colorant therein. Meanwhile, the weight-average molecular weight of the polymer may be measured by the method as described in Examples below.

When the polymer used in the present invention contains a salt-forming group derived from the salt-forming group-containing monomer (a), the salt-forming group is neutralized with a neutralizing agent. As the neutralizing agent, acids or bases may be used according to the kind of the salt-forming group in the polymer. Examples of the neutralizing agent include acids such as hydrochloric acid, acetic acid, propionic acid, phosphoric acid, sulfuric acid, lactic acid, succinic acid, glycolic acid, gluconic acid and glyceric acid, and bases such as lithium hydroxide, sodium hydroxide, potassium hydroxide, ammonia, methylamine, dimethylamine, trimethylamine, ethylamine, diethylamine, triethylamine, triethanolamine and tributylamine.

The degree of neutralization of the salt-forming group is expressed by a molar ratio of the neutralizing agent added, to a whole amount of the salt-forming group contained in the polymer, and is preferably from 10 to 200%, more preferably from 20 to 150% and still more preferably from 50 to 150%. The degree of neutralization of the anionic salt-forming group is calculated according to the following formula (4):

$$\{[\text{weight (g) of neutralizing agent/equivalent of neutralizing agent}]/[\text{acid value of polymer (KOH mg/g)} \times \text{weight (g) of polymer}/(56 \times 1000)]\} \times 100 \quad (4)$$

The degree of neutralization of the cationic salt-forming group is calculated according to the following formula (5):

$$\{[\text{weight (g) of neutralizing agent/equivalent of neutralizing agent}]/[\text{amine value of polymer (HCl mg/g)} \times \text{weight (g) of polymer}/(36.5 \times 1000)]\} \times 100 \quad (5)$$

The acid value or amine value may be calculated from the respective constitutional units of the polymer, or may also be determined by the method of subjecting a solution prepared by dissolving the polymer in an appropriate solvent such as, for example, methyl ethyl ketone, to titration.

[Crosslinked Water-Insoluble Polymer]

The crosslinked water-insoluble polymer used in the second water dispersion of the present invention is obtained by subjecting the water-insoluble polymer used in the first water dispersion to crosslinking reaction. The crosslinking reaction for production of the crosslinked water-insoluble polymer may be the crosslinking reaction between functional groups contained in the polymers or the crosslinking reaction between the water-insoluble polymer and a crosslinking agent. From the viewpoints of a high reaction efficiency and a well-controlled polymerization, the crosslinked water-insoluble polymer is preferably produced by the crosslinking reaction between the water-insoluble polymer and the crosslinking agent. The thus obtained crosslinked water-insoluble polymer is firmly adsorbed on a surface of the respective carbon blacks, so that the resulting water dispersion can be enhanced in storage stability. In addition, since the amount of the polymer which remains unadsorbed on the carbon blacks is reduced, it is considered that the amount of the polymer deposited on a nozzle plate of an ink-jet printer can be reduced even under high-temperature and low-humidity conditions in which the polymer tends to be dried, and the resulting ink can be enhanced in ejection reliability.

[Crosslinking Agent]

The crosslinking agent used in the present invention is preferably selected from those compounds containing at least two reactive groups in a molecule thereof from the viewpoint of a good storage stability. The molecular weight of the crosslinking agent is preferably from 120 to 2000, more preferably from 150 to 1500 and still more preferably from 150 to 1000 in view of a facilitated reaction of the polymer and a good storage stability of the resulting water dispersion and ink containing the crosslinked water-insoluble polymer.

The number of the reactive groups contained in the crosslinking agent is preferably from 2 to 4, more preferably 2 or 3 and most preferably 2 in view of a high reaction efficiency. The reactive groups are preferably one or more groups selected from the group consisting of a hydroxyl group, an epoxy group, an aldehyde group, an amino group and a carboxyl group.

Specific examples of the crosslinking agent include the following compounds (a) to (g):

(a) Compounds containing two or more hydroxyl groups in a molecule thereof:

Example of the compounds containing two or more hydroxyl groups include polyhydric alcohols such as ethylene glycol, diethylene glycol, triethylene glycol, polyethylene glycol, glycerol, polyglycerol, propylene glycol, 1,4-butanediol, 1,5-pentanediol, 1,6-hexanediol, neopentyl alcohol, diethanol amine, tridiethanol amine, polypropylene glycol, polyvinyl alcohol, pentaerythritol, sorbitol, sorbitan, glucose, mannitol, mannitan, sucrose and glucose.

(b) Compounds containing two or more epoxy groups in a molecule thereof:

Examples of the compounds containing two or more epoxy groups include polyglycidyl ethers such as ethylene glycol diglycidyl ether, polyethylene glycol diglycidyl ether, polypropylene glycol diglycidyl ether, glycerol triglycidyl ether, glycerol polyglycidyl ether, polyglycerol polyglycidyl ether, trimethylolpropane polyglycidyl ether, sorbitol polyglycidyl ether, pentaerythritol polyglycidyl ether, resorcinol diglycidyl ether, neopentyl glycol diglycidyl ether and hydrogenated bisphenol A-type diglycidyl ether.

(c) Compounds containing two or more aldehyde groups in a molecule thereof:

Examples of the compounds containing two or more aldehyde groups include polyaldehydes such as glutaraldehyde and glyoxal.

(d) Compounds containing two or more amino groups in a molecule thereof:

Examples of the compounds containing two or more amino groups include polyamines such as ethylenediamine and polyethyleneimine.

(e) Compounds containing two or more carboxyl groups in a molecule thereof:

Examples of the compounds containing two or more carboxyl groups include polycarboxylic acids such as oxalic acid, malonic acid, succinic acid, fumaric acid, maleic acid and adipic acid.

(f) Compounds containing two or more oxazoline groups in a molecule thereof:

Examples of the compounds containing two or more oxazoline groups include compounds containing an aliphatic or aromatic group to which two or more, preferably from 2 or 3 oxazoline groups are bonded. Specific examples of the compounds containing two or more oxazoline groups include bisoxazoline compounds such as 2,2'-bis(2-oxazoline), 1,3-phenylene-bisoxazoline and 1,3-benzobisoxazoline, and compounds containing an end oxazoline group which are obtained by reacting the bisoxazoline compound with a polybasic carboxylic acid.

(g) Compounds containing two or more isocyanate groups in a molecule thereof:

Examples of the compounds containing two or more isocyanate groups include organic polyisocyanates and isocyanate-terminated prepolymers.

Specific examples of the organic polyisocyanates include aliphatic diisocyanates such as hexamethylene diisocyanate and 2,2,4-trimethylhexamethylene diisocyanate; aromatic diisocyanates such as tolylene-2,4-diisocyanate and phenylene diisocyanate; alicyclic diisocyanates; aromatic triisocyanates; and modified products of these polyisocyanates such as urethane-modified polyisocyanates. The isocyanate-terminated prepolymers may be obtained by reacting the organic polyisocyanate or the modified product thereof with a low-molecular weight polyol, etc.

Among these crosslinking agents, preferred are the compounds (b) containing two or more epoxy groups in a molecule thereof, and more preferred are ethylene glycol diglycidyl ether, trimethylolpropane polyglycidyl ether and pentaerythritol polyglycidyl ether.

The water-insoluble polymer used in the present invention has a reactive group (crosslinkable functional group) capable of reacting with the crosslinking agent. The preferred combinations of the polymer and the crosslinking agent are as follows.

When the reactive group of the water-insoluble polymer is an anionic group such as a carboxyl group, a sulfonic group, a sulfuric group, a phosphonic group and a phosphoric group, the polymer is preferably used in combination with the crosslinking agent selected from the above compounds (a), (b), (d), (f) and (g). When the reactive group of the water-insoluble polymer is an amino group, the polymer is preferably used in combination with the crosslinking agent selected from the above compounds (b), (c), and (e) and (g). When the reactive group of the water-insoluble polymer is a hydroxyl group, the polymer is preferably used in combination with the crosslinking agent selected from the above compounds (c), (e) and (g). When the reactive group of the water-insoluble polymer is an isocyanate group or an epoxy group, the polymer is preferably used in combination with the crosslinking agent selected from the above compounds (a), (d) and (e).

Among the above combinations, in view of well controlling the crosslinking reaction of the water-insoluble polymer such that the resulting crosslinked polymer has an adequate crosslinking structure, more preferred is the combination of the water-insoluble polymer containing one or more reactive groups selected from the group consisting of acid groups such as a carboxyl group, a sulfonic acid group and a phosphoric acid group, an amino group and a hydroxyl group, and the compound (b) containing two or more epoxy groups in a molecule thereof.

The polymer containing an anionic group such as a carboxyl group, a sulfonic group and a phosphoric group, an amino group, a hydroxyl group, an isocyanate group, an epoxy group, etc., as the reactive group (crosslinkable functional group) capable of reacting with the above crosslinking agent may be produced by copolymerizing a polymerizable monomer composition containing a monomer having the above reactive group upon the above production of the water-insoluble polymer.

As the polymer containing a salt-forming group such as an anionic group and an amino group as the reactive group capable of reacting with the crosslinking agent, there may be used those polymers obtained by copolymerizing the above salt-forming group-containing monomer. Also, as the polymer containing a hydroxyl group as the reactive group capable of reacting with the crosslinking agent, there may be used those polymers obtained by copolymerizing the above hydroxyl group-containing monomer.

As the polymer containing an epoxy group as the reactive group capable of reacting with the crosslinking agent, there may be used those polymers obtained by copolymerizing an epoxy group-containing monomer, more specifically, those polymers obtained by copolymerizing glycidyl (meth)acrylate. Further, as the polymer containing an isocyanate group as the reactive group capable of reacting with the crosslinking agent, there may be used (i) those polymers obtained by copolymerizing an isocyanate group-containing monomer, for example, isocyanato-ethyl (meth)acrylate, and (ii) those polymers obtained by copolymerizing an isocyanate-terminated prepolymer produced from an unsaturated polyester polyol and an isocyanate.

[Production of Water Dispersion Containing Carbon Blacks and Water-Insoluble Polymer]

The first water dispersion of the present invention is produced by the process including the following steps I and II.

Step I: dispersing a mixture of a water-insoluble polymer, carbon black (a), carbon black (b), an organic solvent and water to obtain a dispersion, in which a difference between acid group contents of the carbon blacks (a) and (b) is from 100 to 1000 µmol/g; and Step II: removing the organic solvent from the dispersion obtained in the step I to obtain a water dispersion.

The carbon black (b) when used solely exhibits a low affinity to the water-insoluble polymer owing to a large acid group content thereof. However, when using the carbon black (b) in combination with the carbon black (a), the carbon blacks can be enhanced in affinity to the water-insoluble polymer and improved in dispersibility. The carbon black (b) is preferably in the form of a non-neutralized product from the viewpoint of enhancing an affinity of both the carbon blacks to the water-insoluble polymer.

The second water dispersion of the present invention is produced by the process further including the following step III.

Step III: reacting the water dispersion obtained in the step II with a crosslinking agent to obtain a water dispersion containing a crosslinked water-insoluble polymer.

By conducting the step III (crosslinking step), the obtained crosslinked water-insoluble polymer is allowed to adhere to the surface of the respective carbon blacks (a) and (b), so that the resulting dispersion can be enhanced in storage stability and ejection reliability even under high-temperature and low-humidity conditions. The reason therefor is considered as follows although it is not clearly determined. That is, the water-insoluble polymer when subjected to the crosslinking reaction can be firmly adsorbed onto the surface of the respective carbon blacks, so that the resulting dispersion can be enhanced in storage stability. Further, since the amount of the polymer which remains unadsorbed on the carbon blacks is reduced, it is considered that the amount of the polymer deposited on a nozzle plate of an ink-jet printer can be reduced even under high-temperature and low-humidity conditions in which the polymer tends to be dried, and the resulting ink can be enhanced in ejection reliability.

(Step I)

In the step I, there is preferably used the method in which the water-insoluble polymer is first dissolved in the organic solvent, and then the carbon black (a), the carbon black (b) and water are added, if required, together with optional components such as a neutralizing agent and a surfactant, to the thus obtained organic solvent solution and then mixed therewith to obtain a dispersion of an oil-in-water type. The total content of the carbon blacks (a) and (b) in the dispersion obtained in the step I is preferably from 5 to 50% by weight and more preferably from 10 to 40% by weight. The content of the organic solvent in the dispersion is preferably from 10 to 70% by weight and more preferably from 10 to 50% by weight. The content of the water-insoluble polymer in the dispersion is preferably from 2 to 40% by weight and more preferably from 3 to 20% by weight, and the content of water in the dispersion is preferably from 10 to 70% by weight and more preferably from 20 to 70% by weight.

The weight ratio of the carbon black (b) to the carbon black (a) [carbon black (b)/carbon black (a)] is preferably from 10/90 to 90/10, more preferably from 10/90 to 50/50 and still more preferably from 10/90 to 40/60 from the viewpoints of effectively exhibiting the synergistic effects of both the carbon blacks (a) and (b) and improving a fixing property, a high lighter fastness and an image density of the resulting ink.

When the water-insoluble polymer contains a salt-forming group, the neutralizing agent is preferably used to neutralize the salt-forming group. The degree of neutralization of the salt-forming group is not particularly limited. The degree of neutralization is preferably controlled such that the finally obtained water dispersion preferably exhibits a liquid property having a pH of from 3.5 to 11 and more preferably from 4.5 to 10. The pH of the dispersion may also be determined from the desired degree of neutralization of the water-insoluble polymer. The neutralizing agent used in the present invention are those exemplified above. In addition, the polymer may be previously neutralized.

Examples of the organic solvents include alcohol solvents such as ethanol, isopropanol and isobutanol; ketone solvents such as acetone, methyl ethyl ketone, methyl isobutyl ketone and diethyl ketone; and ether solvents such as dibutyl ether, tetrahydrofuran and dioxane. The solubility of the organic solvent in 100 g of water as measured at 20° C. is preferably 5 g or more, and more preferably 10 g or more. More specifically, the solubility of the organic solvent in water is preferably from 5 to 80 g and more preferably from 10 to 50 g. Among these organic solvents, preferred are methyl ethyl ketone and methyl isobutyl ketone.

The method for dispersing the mixture in the step I is not particularly limited. The dispersion containing the carbon blacks and the water-insoluble polymer may be obtained by subjecting the mixture to dispersing treatment only one time. Preferably, the mixture is first subjected to a preliminary dispersion procedure, and then to the substantial dispersion procedure by applying a shear stress thereto to produce the polymer particles as desired. The dispersing procedure in the step I is preferably conducted at a temperature of from 5 to 50° C. and more preferably from 10 to 35° C.

When subjecting the mixture to the preliminary dispersion procedure, there may be used ordinary mixing or stirring devices such as anchor blades. Examples of the preferred mixing or stirring devices include high-speed stirring mixers such as "Ultra Disper" (tradename: available from Asada Iron Works Co., Ltd.), "Ebara Milder" (tradename: available from Ebara Corporation), and "TK Homomixer" (tradename: available from Primix Corporation).

As a means for applying a shear stress to the mixture in the substantial dispersion procedure, there may be used, for example, kneading machines such as roll mills, beads mills, kneaders and extruders, homo-valve-type high-pressure homogenizers such as typically "High-Pressure Homogenizer" (tradename: available from Izumi Food Machinery Co., Ltd.) and "Mini-Labo 8.3H Model" (tradename: available from Rannie Corp.), and chamber-type high-pressure homogenizers such as "Micro Fluidizer" (tradename: available from Microfluidics Inc.) and "Nanomizer" (tradename: available from Nanomizer Co., Ltd.). Among these apparatuses, the high-pressure homogenizers are preferred in view of reducing a particle size of the carbon blacks.

The polymer particles contained in the dispersion obtained in the step I preferably have an average particle size of from 40 to 400 nm, more preferably from 50 to 300 nm and still more preferably from 60 to 200 nm. Meanwhile, the average particle size may be measured by the method described below in the Examples.

(Step II)

In the step II, the organic solvent is removed from the thus obtained dispersion by known methods to render the dispersion aqueous, thereby obtaining a water dispersion containing the two kinds of carbon blacks (a) and (b) and the water-insoluble polymer. The organic solvent is substantially completely removed from the thus obtained water dispersion. The content of the residual organic solvent in the resulting water dispersion is preferably 0.1% by weight or less and more preferably 0.01% by weight or less.

In the thus obtained water dispersion, the two kinds of carbon blacks (a) and (b) and the water-insoluble polymer are dispersed in a medium containing water as a main component, and the water-insoluble polymer adhere to the surface of the respective carbon blacks (a) and (b). It is preferred that the carbon blacks (a) and (b) be covered with the water-insoluble polymer. The condition of adhesion of the water-insoluble polymer may be confirmed by an electron microscope. In addition, the rate of adhesion of the polymer onto the carbon blacks (a) and (b) in the water dispersion may be determined by the centrifugal separation method described below in the Examples.

The configuration of the resulting dispersion is not particularly limited. Examples of the configuration of the dispersion include (1) the configuration in which the particles formed by allowing the water-insoluble polymer to adhere like a binder onto the surface of the respective two kinds of carbon blacks (a) and (b) are dispersed, (2) the configuration in which the carbon black (a) enclosed in the water-insoluble polymer is dispersed, (3) the configuration in which the carbon black (a) exposed onto the surface of the respective water-insoluble polymer particles is dispersed, (4) the configuration in which the carbon black (b) on the surface of which the water-insoluble polymer partially adheres is dispersed, and combinations of these configurations.

(Step III)

In the step III, the water dispersion obtained in the step II is reacted with a crosslinking agent to crosslink the water-insoluble polymer in the water dispersion, thereby obtaining a water dispersion containing a crosslinked water-insoluble polymer.

The water-insoluble polymer when crosslinked is gelled while being kept adhering to the carbon blacks and, therefore, becomes hardly dissolved in a solvent. Therefore, by using the method in which a solvent capable of dissolving the water-insoluble polymer such as methyl ethyl ketone is added to the water dispersion, and then the resulting solution is subjected to filtration, centrifugal separation, extraction, etc., to separate solvent-soluble components from the carbon blacks, the crosslinked condition of the resulting polymer in the water dispersion can be confirmed since the amount of the solvent-soluble components in the water dispersion (amount of polymer extracts) after subjected to the crosslinking reaction is smaller than that before subjected to the crosslinking reaction.

As the method of crosslinking the polymer, from the viewpoints of a good storage stability and facilitated production of the crosslinked polymer, there is preferably used the method of mixing the water dispersion containing the water-insoluble polymer with the crosslinking agent to allow the polymer to be crosslinked. It is considered that this method improves a storage stability of the resulting ink while keeping a good image density thereof.

The catalyst, solvent, temperature and time used in the crosslinking reaction may be appropriately selected and determined according to the crosslinking agent used therein. The crosslinking reaction temperature is preferably from 40 to 95° C., and the crosslinking reaction time is preferably from 0.5 to 10 h and more preferably from 1 to 5 h.

The amount of the crosslinking agent used in the crosslinking reaction is preferably 0.5 part by weight or more, more preferably 0.7 part by weight or more, still more preferably 0.85 part by weight or more, further still more preferably 1 part by weight or more and further still more preferably 1.5 parts by weight or more on the basis of 100 parts by weight of the water-insoluble polymer from the viewpoints of a good storage stability and a good ejection reliability under high-temperature and low-humidity conditions. The upper limit of the amount of the crosslinking agent used is preferably 9.5 parts by weight or less, more preferably 8 parts by weight or less, still more preferably 7.5 parts by weight or less, further still more preferably 7.0 parts by weight or less, further still more preferably 6.5 parts by weight or less and further still more preferably 6 parts by weight or less from the viewpoint of a good storage stability. From these viewpoints, the amount of the crosslinking agent used is preferably from 0.5 to 9.5 parts by weight, more preferably from 0.5 to 8 parts by weight, still more preferably from 0.7 to 8 parts by weight, further still more preferably from 0.85 to 7.5 parts by weight, further still more preferably from 1 to 7.0 parts by weight, further still more preferably from 1 to 6.5 parts by weight and further still more preferably from 1.5 to 6 parts by weight.

In the water dispersion thus obtained in the step III, the two kinds of carbon blacks (a) and (b) and the crosslinked water-insoluble polymer are dispersed in a medium containing water as a main component. It is preferred that the crosslinked water-insoluble polymer be allowed to adhere to the surface of the respective carbon blacks (a) and (b), and the carbon blacks (a) and (b) be covered with the crosslinked water-insoluble polymer.

The configuration of the resulting water dispersion is not particularly limited. Examples of the configuration of the water dispersion include (1) the configuration in which the particles respectively composed of a plurality of carbon black particles which are formed by allowing the crosslinked water-insoluble polymer to adhere onto the surface of the respective carbon blacks (a) and (b) are dispersed, (2) the configuration in which the carbon blacks (a) and (b) enclosed in the crosslinked water-insoluble polymer are dispersed, (3) the configuration in which the carbon blacks (a) and (b) exposed onto the surface of the respective crosslinked water-insoluble polymer particles are dispersed, (4) the configuration in which the carbon blacks (a) and (b) on the surface of which the crosslinked water-insoluble polymer partially adheres are dispersed, and combinations of these configurations.

The first water dispersion and the second water dispersion obtained in the above steps may also contain various other additives such as a wetting agent unless the inclusion of these additives adversely affects the effects of the present invention.

[Water Dispersion for Ink-Jet Printing]

From the viewpoint of enhancing an image density, a fixing property, a high lighter fastness, an image uniformity, an ejection reliability and a storage stability, the contents of the respective components in the water dispersion for ink-jet printing are as follows.

The total content of the carbon blacks (a) and (b) and the water-insoluble polymer in the water dispersion is preferably from 1 to 30% by weight and more preferably from 2 to 25% by weight.

The total content of the carbon blacks (a) and (b) in the water dispersion is preferably from 0.5 to 20% by weight, more preferably from 1 to 15% by weight and still more preferably from 1 to 10% by weight.

The content of the water-insoluble polymer in the water dispersion is preferably from 0.5 to 20% by weight, more preferably from 1 to 15% by weight and still more preferably from 1 to 10% by weight.

The content of water in the water dispersion is preferably from 30 to 90% by weight and more preferably from 40 to 80% by weight.

The average particle size of the polymer particles dispersed in the water dispersion in any manner of the above configurations is preferably from 40 to 400 nm, more preferably from 50 to 300 nm and still more preferably from 60 to 200 nm from the viewpoints of a good ejection reliability and a good dispersion stability, etc. Meanwhile, the average particle size of the polymer particles in the water dispersion may be measured by the method described in the Examples below.

The viscosity of the water dispersion having a solid content of 10% by weight is preferably from 2 to 6 mPa·s and more preferably from 2 to 5 mPa·s as measured at 20° C. to produce a water-based ink having a good viscosity. Meanwhile, the viscosity of the water dispersion may be measured at 20° C. for 1 min using an E-type viscometer with a standard rotor (1°34'×R24) operated at a rotating speed of 100 rpm.

The surface tension of the water dispersion of the present invention is preferably from 30 to 70 mN/m and more preferably from 35 to 68 mN/m as measured at 20° C.

[Water-Based Ink for Ink-Jet Printing]

The water-based ink of the present invention contains the water dispersion of the present invention, and may further contain various additives such as a wetting agent, a dispersant, a defoaming agent, a mildew-proof agent and a chelating agent, if required. The method of mixing these additives in the water-based ink is not particularly limited.

From the viewpoint of enhancing an image density, a fixing property, a high lighter fastness, an image uniformity, an ejection reliability and a storage stability, the contents of the respective components in the water-based ink for ink-jet printing are as follows.

The total content of the carbon blacks (a) and (b) and the water-insoluble polymer in the water-based ink is preferably from 1 to 30% by weight and more preferably from 2 to 25% by weight.

The total content of the carbon blacks (a) and (b) in the water-based ink is preferably from 0.5 to 20% by weight, more preferably from 1 to 15% by weight and still more preferably from 1 to 10% by weight.

The content of the water-insoluble polymer in the water-based ink is preferably from 0.5 to 20% by weight, more preferably from 1 to 15% by weight and still more preferably from 1 to 10% by weight.

The content of water in the water-based ink is preferably from 30 to 90% by weight and more preferably from 40 to 80% by weight.

The average particle size of the polymer particles dispersed in the water-based ink in any manner of the above configurations is preferably from 40 to 400 nm, more preferably from 50 to 300 nm and still more preferably from 60 to 200 nm from the viewpoints of a good ejection reliability and a good dispersion stability. Meanwhile, the average particle size of the polymer particles in the water-based ink may be measured by the method described below in the Examples.

The viscosity of the water-based ink is preferably from 2 to 12 mPa·s and more preferably from 2.5 to 10 mPa·s as measured at 20° C. Meanwhile, the viscosity of the water-based ink may be measured at 20° C. for 1 min using an E-type viscometer with a standard rotor (1°34'×R24) operated at a rotating speed of 100 rpm.

The surface tension of the water-based ink of the present invention is preferably from 25 to 50 mN/m and more preferably from 27 to 45 mN/m as measured at 20° C. The pH of the water-based ink is preferably from 4 to 10.

EXAMPLES

In the following production examples, examples and comparative examples, the "part(s)" and "%" indicate "part(s) by weight" and "% by weight", respectively, unless otherwise specified. Meanwhile, the weight-average molecular weight of polymer, average particle size and acid group content were respectively measured by the following methods.

(1) Measurement of Weight-Average Molecular Weight of Polymer

The weight-average molecular weight of the polymer was measured by gel permeation chromatography using "G4000HXL+G2000HXL" available from Toso Corp., as a column and tetrahydrofuran (THF) containing 50 mM of $CH_3COOH$ (extra pure reagent) as an eluent, in terms of polystyrene as a standard substance.

(2) Measurement of Average Particle Size

The average particle size of the particles was measured by using a laser particle analyzing system "ELS-8000" (cumulant analysis) available from Otsuka Electronics Co., Ltd. The measurement was conducted at a temperature of 25° C., an angle between incident light and detector of 90° and a cumulative frequency of 100 times, and a refractive index of water (1.333) was input to the analyzing system as a refractive index of the dispersing medium. Further, the measurement was usually conducted by adjusting a concentration of the dispersion to be measured to about $5\times10^{-3}$% by weight.

(3) Measurement of Acid Group Content

The acid group content was measured by the following method in which the acid group content was determined as an amount capable of reacting with a strong alkali such as NaOH and KOH.

(Measuring Conditions)

Apparatus: Potentiometric Automatic Titration Device "AT-610" available from Kyoto Electronics Manufacturing Co., Ltd.

Titration Conditions: 0.01 N-HCl; Amount Titrated: 0.02 mL; Time Interval: 30 s; 25° C., wherein a 0.01 mol/L sodium hydroxide (for volumetric analysis) available from Wako Pure Chemical Industries, Ltd., was used as 0.01 N—NaOH, and a 0.01 mon hydrochloric acid (for volumetric analysis) available from Wako Pure Chemical Industries, Ltd., was used as 0.01 N—HCl.

(Measuring Procedure)

The water dispersion of carbon blacks was accurately weighed in an amount of 0.05 g in terms of solid components thereof, and mixed with ion-exchanged water to adjust a volume of the dispersion to 50 mL. To the thus obtained dispersion was added 1.5 mL (excess amount) of 0.01 N—NaOH, and the resulting dispersion was stirred for 30 min to convert all of acid groups contained in the carbon black into a Na salt. Then, 0.01 N—HCl was added dropwise to the thus obtained alkali dispersion at the intervals of 30 s in an amount of 0.02 g for each addition while stirring the dispersion to measure a pH thereof. On the thus prepared characteristic curve, a neutralization point (inflection point 1) at which the excess amount of alkali was neutralized and another neutralization point (final inflection point 2) which was located on the most acidic side among neutralization inflection points successively observed subsequent to the inflection point 1 were determined as a starting point and a terminal point, respectively. The acid group content in the carbon black particles was calculated from the amount of 0.01 N—HCl used between the final inflection point 2 and the inflection point 1, and expressed by an equivalent amount per 1 g of the solid components. The measurement was carried out at 20° C.

The properties of the water-based inks obtained in the respective Example and Comparative Examples were evaluated by the following methods.

(4) Image Density

Solid image printing was carried out on a plain paper "4024" (available from Fuji Xerox Corp.) using an ink-jet printer "EM-930C" (product number) commercially available from Seiko Epson Corporation. After allowing the printed paper to stand for one day, the image density values of the resulting print were measured at optional 10 points on the paper using an optical densitometer "SpectroEye" (available from Gretag Macbeth Corp.) to calculate an average value thereof.

(5) Fixing Property

Solid image printing having a size of 20 mm×20 mm was carried out on the same plain paper "4024" using the same ink-jet printer as used in the above (4). After the elapse of 10 s, another plain paper "P" (available from Fuji Xerox Corp.) was overlapped on the printed solid image, and further a load of 490 g (loaded area: 43 mm×30 mm) was placed on the paper. While keeping such a loaded condition, the solid image-printed paper was moved to measure stains on the overlapped paper. The results were evaluated on the basis of the following evaluation criteria.
[Evaluation Criteria]

A: Substantially no peeling of the printed image occurred, and surrounding portions were free from blackish stains;

B: Substantially no peeling of the printed image occurred, and surrounding portions suffered from slight blackish stains, but still kept an acceptable level without practical problems; and C: Printed image was rubbed off, and surrounding portions suffered from significant blackish stains, and fingers were considerably stained when rubbed.

(6) High Lighter-Fastness

Text printing was carried out on the same plain paper "4024" using the same printer as used the above (4), and after the elapse of 6 h, the extent of staining of the printed sample when the surface of the text image was traced with a fluorescent marker "BEAM LINER S BM-151" (tradename) commercially available from Zebra Co., Ltd., was observed with naked eyes, and the high lighter-fastness was evaluated on the basis of the following evaluation criteria.
[Evaluation Criteria]

A: No rubbed stains were generated when traced with a fluorescent marker.

B: Some rubbed stains were generated when traced with a fluorescent marker, but at a level without practical problems.

C: Generation of rubbed stains were observed when traced with a fluorescent marker, and significant staining occurred.

(7) Image Uniformity (Hiding Property)

Solid image printing was carried out on the same plain paper "4024" available from Fuji Xerox Corp., using the same ink-jet-printer as used in the above (4), to conduct a sensory evaluation about whether or not any unevenness of density of the printed image occurred. The results were evaluated according to the following evaluation criteria.
[Evaluation Criteria]

A: No unevenness of density of the printed image occurred;

B: Some unevenness of density of the printed image occurred; and

C: Significant unevenness of density of the printed image occurred.

(8) Ejection Reliability (a)

Character image printing was continuously carried out under a room temperature condition (23° C.; 50% RH) at a rate of 2000 characters per sheet on 100 sheets of the same plain paper "4024" using the same ink-jet printer as used in the above (4), and then a test document including characters, solid image and ruled lines was printed on the paper to evaluate the following three items:
 (i) Sharp and clear characters;
 (ii) Uniform solid image; and
 (iii) No slippage or deviation of ruled lines.

The results were evaluated according to the following evaluation criteria.
[Evaluation Criteria]

A: All of the three items were satisfied (at an acceptable level without any practical problems);

B: The three items were almost satisfied (Still at an acceptable level without practical problems); and C: One or more items were unsatisfied (at an unacceptable level with significant practical problems).

(9) Ejection Reliability (b)

Character image printing was continuously carried out under high-temperature and low-humidity conditions (35° C.; 20% RH) at a rate of 2000 characters per sheet on 100 sheets of the same plain paper "4024" using the same ink-jet printer as used in the above (4), and then a test document including characters, solid image and ruled lines was printed on the paper to evaluate the following three items:
 (i) Sharp and clear characters;
 (ii) Uniform solid image; and
 (iii) No slippage or deviation of ruled lines.

The results were evaluated according to the following evaluation criteria.
[Evaluation Criteria]

A: All of the three items were satisfied (at an acceptable level without any practical problems);

B: The three items were almost satisfied (Still at an acceptable level without practical problems); and C: One or more items were unsatisfied (at an unacceptable level with significant practical problems).

(10) Storage Stability

The water-based ink filled in a sealed glass container was preserved at 70° C. for 30 days to measure viscosity values of the ink before and after the preservation at 20° C. using an E-type viscometer "RE 80L" available from Toki Sangyo Co., Ltd. The rate of change in viscosity of the ink was determined according to the following formula (the value closer to 100% indicates a higher storage stability).

$$\text{Storage stability (\%)} = ([\text{Viscosity after preservation}]/[\text{Viscosity before preservation}]) \times 100$$

(11) Measurement of Rate of Adhesion of Polymer

The rate of adhesion of the polymer adhering to carbon blacks in the water dispersion was determined by the following centrifugal separation method.
(Measuring Conditions)

Apparatus: High-Speed Cooling Centrifuge "himac CR22G" available from Hitachi Koki Co., Ltd. (equipped with a rotor "RPR18-3" available from Hitachi Koki Co., Ltd.)

Centrifugal Separation Conditions: 18000 r/m; 3 h; 25° C.
(Measuring Procedure)

The water dispersion of carbon blacks was accurately weighed in an amount of 0.9 g, and diluted with ion-exchanged water into a concentration of $\frac{1}{10}$ time by weight and stirred until forming a uniform dispersion. The resulting dispersion was charged into a tube and subjected to centrifugal separation under the above-mentioned conditions. After completion of the centrifugal separation, the precipitated solids were removed from the dispersion, and only a supernatant thereof was taken out to measure an amount of solid components in the dispersion. The rate of adsorption of the polymer to the carbon blacks was calculated according to the following formula. Meanwhile, all of amounts of the solid components described below were calculated on the basis of those contained in 0.9 g of the water dispersion.

$$\text{Rate of Adsorption of Polymer (\%)} = [(\text{Amount (g) of polymer in water dispersion of carbon blacks before centrifugal separation}) - (\text{Amount (g) of solid components in water dispersion of carbon blacks after centrifugal separation})]/(\text{Amount (g) of polymer in water dispersion of carbon blacks before centrifugal separation}) \times 100$$

Meanwhile, the amount of the polymer in the water dispersion of carbon blacks before centrifugal separation was calculated according to the following formula.

$$\text{Amount (g) of polymer in water dispersion of carbon blacks before centrifugal separation} = (\text{Amount (g) of solid components in water dispersion of carbon blacks before centrifugal separation}) \times (\text{Amount (weight part) of polymer charged})/[(\text{Amount (weight part) of polymer charged}) + (\text{Amount (weight part) of carbon blacks charged})]$$

Production Examples 1 to 3

Production of Water-Insoluble Polymer Solution

Ten parts of methyl ethyl ketone and 0.02 part of a chain transfer agent (2-mercaptoethanol) as well as monomers to be initially charged as shown in Table 1 (in which their amounts are represented by weight part(s)) were charged into a reaction vessel and mixed with each other, and then the reaction vessel was fully purged with a nitrogen gas to thereby obtain an initially charging monomer mixture solution.

Separately, monomers to be dropped as shown in Table 1 (in which their amounts are expressed by weight part(s)) were charged into a dropping funnel, and then 0.08 part of the chain transfer agent, 80 parts of methyl ethyl ketone and 0.5 part of a polymerization initiator (2,2'-azobis(2,4-dimethylvaleronitrile)) were added thereto and mixed with each other, and the dropping funnel was fully purged with a nitrogen gas to thereby obtain a dropping monomer mixture solution.

The initially charging monomer mixture solution in the reaction vessel was heated to 75° C. while stirring in a nitrogen atmosphere, and then the dropping monomer mixture solution in the dropping funnel was gradually dropped into the reaction vessel over 3 h. After completion of the dropping, the resulting reaction solution was maintained at a temperature of 75° C. for 2 h, and then a solution prepared by dissolving 0.6 part of the polymerization initiator in 10 parts of methyl ethyl ketone was added to the reaction solution in the reaction vessel, and further the reaction solution was allowed to stand at 75° C. for 1 h. This procedure was repeated 3 times. Then, the obtained reaction solution was aged at 85° C. for 2 h, thereby obtaining a water-insoluble polymer solution.

A part of the thus obtained water-insoluble polymer solution was dried at 105° C. under reduced pressure for 2 h to remove the solvent from the solution and isolate the water-insoluble polymer therefrom. The weight-average molecular weight of the thus obtained water-insoluble polymer was measured.

The results are shown in Table 1. Meanwhile, the numerical values in Table 1 represent weight part(s) of the respective effective components.

Production Example 4

Production of Crosslinking Group-Containing Water-Insoluble Polymer Solution The water-insoluble polymer solution was produced in the same manner as in Production Example 1 except for using the raw materials as shown in Table 1, and then methyl ethyl ketone was added thereto to adjust the solid concentration of the solution to 26% by weight. The results are shown in Table 1.

TABLE 1

| | Production Examples | | | |
|---|---|---|---|---|
| | 1 | 2 | 3 | 4 |
| Monomer solution to be initially charged (weight part) | | | | |
| (a) Methacrylic acid | 3 | 2.8 | 2.8 | 2.8 |
| (b) Styrene macromer*[1] | 2.2 | 3 | 3 | 3 |
| (c) Stearyl methacrylate | 10 | — | — | — |
| (d) Styrene | 2 | 9.2 | 9.2 | 8.6 |
| (d) Polypropylene glycol monomethacrylate*[2] | 2.8 | 5 | — | 5 |
| (e) Octoxypolyethylene glycol mono-methacrylate*[3] | — | — | 5 | — |
| 2,3-Epoxypropyl methacrylate | — | — | — | 0.6 |
| Methyl ethyl ketone | 10 | 10 | 10 | 10 |
| 2-Mercaptoethanol | 0.02 | 0.02 | 0.02 | 0.02 |
| Monomer solution to be dropped (weight part) | | | | |
| (a) Methacrylic acid | 12 | 11.2 | 11.2 | 11.2 |
| (b) Styrene macromer*[1] | 8.8 | 12 | 12 | 12 |
| (c) Stearyl methacrylate | 40 | — | — | — |
| (d) Styrene | 8 | 36.8 | 36.8 | 34.4 |
| (d) Polypropylene glycol monomethacrylate*[2] | 11.2 | 20 | — | 20 |
| (e) Octoxypolyethylene glycol mono-methacrylate*[3] | — | — | 20 | — |
| 2,3-Epoxypropyl methacrylate | — | — | — | 2.4 |
| Methyl ethyl ketone | 80 | 80 | 80 | 80 |
| 2-Mercaptoethanol | 0.08 | 0.08 | 0.08 | 0.08 |
| 2,2'-Azobis(2,4-dimethyl valeronitrile) | 0.5 | 0.5 | 0.5 | 0.5 |
| Weight-average molecular weight of water-insoluble polymer produced | 51,000 | 45,000 | 48,000 | 54,000 |

Note
*[1]"AS-6S" (tradename) available from Toagosei Co., Ltd.; number-average molecular weight: 6000
*[2]"PP1000" (tradename) available from NOF Corp.; average molar number of addition of propyleneoxide: 5; end group: hydrogen atom
*[3]Product developed by Shin-Nakamura Kagaku Kogyo Co., Ltd.; average molar number of addition of ethyleneoxide: 4; end group: 2-ethylhexyl group

Production Example 5

Production of Crosslinking Group-Containing Water-soluble Polymer Solution

The same procedure as in Production Example 4 was repeated except for using a mixed solution containing 200 parts of n-butyl methacrylate, 250 parts of butyl acrylate, 150 parts of 2-hydroxyethyl methacrylate, 170 parts of methacrylic acid, 200 parts of styrene, 30 parts of 2,3-epoxypropyl methacrylate and 80 parts of "PERBUTYL O" (effective ingredient: t-butyl peroxy 2-ethylhexanoate; available from NOF Corp.) as the dropping monomer mixture solution, thereby obtaining a solution of a polymer having a weight-average molecular weight of 22,100. Methyl ethyl ketone was added to the thus obtained polymer solution to adjust a solid concentration thereof to 26% by weight.

Examples 1 to 4

(1) Production of Water Dispersion Containing Carbon Blacks and Water-Insoluble Polymer Twenty five parts of the polymer produced by drying the polymer solution obtained in the respective Production Examples 1 to 3 under reduced pressure were dissolved in 71.5 parts of methyl ethyl ketone. Then, a mixture containing 209.7 parts of ion-exchanged water and a neutralizing agent (5 N sodium hydroxide aqueous solution) in an amount of 60% based on an acid value of the polymer was added to the resulting solution to neutralize a salt-forming group of the polymer. Further, 75 parts of carbon blacks as shown in Table 2 (any two carbon blacks of CB-1 to CB-4) were added to the solution, and the resulting dispersion was dispersed using a disper. The obtained mixture was further dispersed under a pressure of 180 MPa by passing through a dispersing apparatus "MICROFLUIDIZER" (tradename) available from Microfluidics Corp., 15 times. The resulting dispersion was placed in an evaporator at 60° C. under reduced pressure to remove methyl ethyl ketone therefrom, thereby obtaining a water dispersion containing the carbon blacks and the water-insoluble polymer (solid content: 20%).

(2) Production of Water-Based Ink

Twenty five parts of the thus obtained water dispersion containing polymer particles constituted from the carbon blacks and the water-insoluble polymer, 10 parts of glycerol, 5 parts of 2-{2-(2-butoxyethoxy)ethoxy}ethanol, 2 parts of hexanediol, 0.5 part of an acetylene glycol EO adduct (n=10) and 57.5 parts of ion-exchanged water were mixed with each other. The resulting liquid mixture was filtered through a 1.2 gm-mesh membrane filter ("Minisart" (tradename) available from Sartorius Inc.), thereby obtaining a water-based ink. The results are shown in Table 2.

Comparative Example 1

The same procedure as in Example 1 was repeated except for using 75 parts of carbon black (a) (CB-1) solely, thereby producing a water-based ink. The results are shown in Table 2.

Comparative Example 2

The same procedure as in Example 1 was repeated except for using 75 parts of two kinds of carbon blacks (a) (CB-1 and CB-2; weight ratio CB-1/CB-2: 15/85) which were identical in acid group content to each other, thereby producing a water-based ink. The results are shown in Table 2.

Comparative Example 3

The same procedure as in Example 1 was repeated except for using 75 parts of carbon black (b) (CB-3) solely, thereby producing a water-based ink. The results are shown in Table 2.

Comparative Example 4

The same procedure as in Example 1 was repeated except for using no water-insoluble polymer and using a commercially available water dispersion (available from Orient Chemical Industries Co., Ltd.; CW-1; solid content: 20%) such that the amount of the carbon black contained in the resulting dispersion in terms of its solid content was equal to the amount of the carbon blacks used in Example 1, thereby producing a water-based ink. The results are shown in Table 2.

Comparative Example 5

The water dispersion containing carbon black (a) and the water-insoluble polymer (solid content: 20%) was produced in the same manner as in Example 1 except for using 75 parts of carbon black (a) solely.

Then, 18.75 parts of the thus obtained water dispersion of water-insoluble polymer particles containing carbon black (a), 0.94 part of CB-3 (solid content: 100%), 10 parts of glycerol, 5 parts of 2-{2-(2-butoxyethoxy)ethoxy}ethanol, 2 parts of hexanediol, 0.5 part of an acetylene glycol EO adduct (n=10) and 62.81 parts of ion-exchanged water were mixed with each other such that the amount of the carbon blacks contained in the resulting dispersion in terms of its solid content was equal to the amount of the carbon blacks used in Example 1. The resulting liquid mixture was filtered through a 1.2 μm-mesh membrane filter ("Minisart" (tradename) available from Sartorius Inc.), thereby obtaining a water-based ink.

In Comparative Example 5, it was confirmed that no water-insoluble polymer adhered to the carbon black (CB-3).

The "average particle size" as shown in Table 2 indicates the value of the particles contained in the water dispersion in which the carbon black (a) (CB-1) was dispersed with the water-insoluble polymer.

Comparative Example 6

The same procedure as in Example 1 was repeated except for using 75 parts of carbon black (a) (CB-6) solely, thereby producing a water-based ink. The results are shown in Table 2.

Comparative Example 7

The same procedure as in Example 1 was repeated except for using 75 parts of carbon blacks (a) (CB-6 and CB-7; weight ratio CB-6/CB-7: 15/85) solely, thereby producing a water-based ink. The results are shown in Table 2.

Example 5

The same procedure as in Example 1 was repeated except for using CB-8 as the carbon black (b), thereby producing a water-based ink. The results are shown in Table 2.

Comparative Example 8

The same procedure as in Example 4 was repeated except for using 75 parts of carbon black (a) (CB-1) solely, thereby producing a water-based ink. The results are shown in Table 2.

Comparative Example 9

The same procedure as in Example 4 was repeated except for using 75 parts of carbon black (b) (CB-8) solely, thereby producing a water-based ink. The results are shown in Table 2.

Example 6

The water dispersions obtained in Comparative Examples 1 and 3 were mixed and stirred with each other at a mixing ratio (weight ratio) of the water dispersion obtained in Comparative Example 1 to the water dispersion obtained in Comparative Example 3 of 15:85 in terms of carbon black contents therein, thereby obtaining a mixed water dispersion. The same procedure as in Example 1(2) was repeated except for using the thus obtained mixed water dispersion, thereby obtaining a water-based ink. The results are shown in Table 2.

TABLE 2

|  | Examples | | | |
| --- | --- | --- | --- | --- |
|  | 1 | 2 | 3 | 4 |
| Production Examples of water-insoluble polymers | Pro. Ex. 2** | Pro. Ex. 2** | Pro. Ex. 3** | Pro. Ex. 1** |
| Carbon black (a) | | | | |
| Kind*[1] | CB-1 | CB-2 | CB-1 | CB-1 |
| Acid group content ($\mu$mol/g) | 0 | 0 | 0 | 0 |
| DBP oil absorption (mL/100 g) | 105 | 68 | 105 | 105 |
| Carbon black (b) | | | | |
| Kind*[2] | CB-3 | CB-3 | CB-4 | CB-3 |
| Acid group content ($\mu$mol/g) | 645 | 645 | 800 | 645 |
| Weight ratio of carbon black (b) to carbon black (a) [(b)/(a)] | 15/85 | 25/75 | 15/85 | 15/85 |
| Difference between acid group contents of carbon blacks (a) and (b): (b) − (a) ($\mu$mol/g) | 645 | 645 | 800 | 645 |
| Evaluation results | | | | |
| Average particle size (nm) | 116 | 134 | 112 | 114 |
| (1) Image density 6200 | 1.33 | 1.31 | 1.31 | 1.31 |
| (2) Fixing property | A | A | A | A |
| (3) High lighter fastness | A | A | A | A |
| (4) Image uniformity | A | A | A | A |
| (5) Ejection reliability | A | A | A | A |
| (7) Storage stability (%) | 110 | 108 | 104 | 107 |
| (8) Rate of adhesion of polymer (%) | — | — | — | — |

|  | Comparative Examples | | | | | | |
| --- | --- | --- | --- | --- | --- | --- | --- |
|  | 1 | 2 | 3 | 4 | 5 | 6 | 7 |
| Production Examples of water-insoluble polymers | Pro. Ex. 1 | Pro. Ex. 1 | Pro. Ex. 1 | None | Pro. Ex. 1 | Pro. Ex. 2 | Pro. Ex. 2 |
| Carbon black (a) | | | | | | | |
| Kind*[1] | CB-1 | CB-1/CB-2 (15/85) | — | — | CB-1 | CB-6 | CB-6/CB-1 (15/85) |
| Acid group content ($\mu$mol/g) | 0 | 0 | — | — | 0 | 57 | — |
| DBP oil absorption (mL/100 g) | 105 | 73.6 | — | — | 105 | 150 | 111.8 |
| Carbon black (b) | | | | | | | |
| Kind*[2] | — | — | CB-3 | CB-5 | CB-3 | — | — |
| Acid group content ($\mu$mol/g) | — | — | 645 | — | 645 | — | — |
| Weight ratio of carbon black (b) to carbon black (a) [(b)/(a)] | 0/100 | 0/100 | 100/0 | 100/0 | 15/85 | 0/100 | 0/100 |
| Difference between acid group contents of carbon blacks (a) and (b): (b) − (a) ($\mu$mol/g) | — | — | — | — | 645 | — | — |
| Evaluation results | | | | | | | |
| Average particle size (nm) | 86 | 119 | 142 | 98 | 86 | 113 | 109 |
| (1) Image density 6200 | 1.16 | 1.21 | 1.30 | 1.23 | 1.30 | 1.24 | 1.22 |
| (2) Fixing property | A | A | C | C | B | B | B |
| (3) High lighter fastness | A | A | C | C | B | B | B |
| (4) Image uniformity | B | A | A | B | A | A | A |
| (5) Ejection reliability | A | B | C | A | C | C | B |

TABLE 2-continued

|  | Ex. 5 | Com. Ex. 8 | Com. Ex. 9 | Ex. 6 |
|---|---|---|---|---|
| (7) Storage stability (%) | 100 | 111 | >200 | 100 | 164 | >200 | 115 |
| (8) Rate of adhesion of polymer (%) | — | — | — | — | — | — | — |

| | Ex. 5 | Com. Ex. 8 | Com. Ex. 9 | Ex. 6 |
|---|---|---|---|---|
| Production Examples of water-insoluble polymers | Pro. Ex. 2 | Pro. Ex. 2 | Pro. Ex. 2 | *3 |
| Carbon black (a) | | | | |
| Kind*1 | CB-1 | CB-1 | — | CB-1 |
| Acid group content ($\mu$mol/g) | 0 | 0 | — | 0 |
| DBP oil absorption (mL/100 g) | CB-8 | 105 | — | 105 |
| Carbon black (b) | | | | |
| Kind*2 | CB-1 | — | CB-8 | CB-3 |
| Acid group content ($\mu$mol/g) | 700 | — | 700 | 645 |
| Weight ratio of carbon black (b) to carbon black (a) [(b)/(a)] | 15/85 | 0/100 | 100/0 | 15/85 |
| Difference between acid group contents of carbon blacks (a) and (b): (b) – (a) ($\mu$mol/g) | 700 | — | — | 645 |
| Evaluation results | | | | |
| Average particle size (nm) | 114 | 106 | 116 | 124 |
| (1) Image density 6200 | 1.35 | 1.16 | 1.34 | 1.32 |
| (2) Fixing property | A | A | B | A |
| (3) High lighter fastness | A | A | C | B |
| (4) Image uniformity | A | C | B | A |
| (5) Ejection reliability | A | A | B | A |
| (7) Storage stability (%) | 107 | 103 | 181 | 110 |
| (8) Rate of adhesion of polymer (%) | 87.5 | 84.7 | 88.5 | — |

Note
*1CB-1: "MONARCH880" (available from Cabot Corp.)
CB-2: "MONARCH800" (available from Cabot Corp.)
CB-6: "Colour Black S 160" (available from Degussa AG.);
*2CB-3: Self-dispersible carbon black oxidized with peroxodisulfate (DBP oil absorption: 105 mL/100 g)
CB-4: Self-dispersible carbon black oxidized with peroxodisulfate (DBP oil absorption: 105 mL/100 g)
CB-5: "CW-1" available from Orient Chemical Industries Co., Ltd. (acid group content: 470 $\mu$mol/g)
CB-8: Self-dispersible carbon black oxidized with hypochlorite (DBP oil absorption: 117 mL/100 g)
Note
*3(Water dispersion obtained in Comparative Example 1):(Water dispersion obtained in Comparative Example 3) = 15:85 (weight ratio)
**Production Example From Table 2, it was confirmed that the water-based inks obtained in Examples 1 to 6 were excellent in image density on a plain paper, fixing property, high lighter fastness, image uniformity, ejection reliability (a) at room temperature and storage stability as compared to those obtained in Comparative Examples 1 to 9.

Example 7

(1) Production of Water Dispersion Containing Carbon Blacks and Crosslinked Water-Insoluble Polymer Twenty five parts of the polymer produced by drying the polymer solution obtained in Production Example 2 under reduced pressure were dissolved in 71.3 parts of methyl ethyl ketone. Then, a mixture containing 222.3 parts of ion-exchanged water and a neutralizing agent (5 N sodium hydroxide aqueous solution) in an amount of 65% based on an acid value of the polymer was added to the resulting solution to neutralize a salt-forming group of the polymer. Further, 75 parts of carbon blacks as shown in Table 3 were added to the solution, and the resulting dispersion was dispersed using a disper. The obtained mixture was further dispersed under a pressure of 180 MPa by passing through a dispersing apparatus "MICROFLUIDIZER" (tradename) available from Microfluidics Corp., 15 times. The resulting dispersion was placed in an evaporator at 60° C. under reduced pressure to remove methyl ethyl ketone therefrom, thereby obtaining a water dispersion containing the carbon blacks and the water-insoluble polymer (solid content: 20%).

Then, 0.18 part of a crosslinking agent "DENACOL EX-321" (tradename) (trimethylol propane polyglycidyl ether; available from Nagase ChemteX Corp.; epoxy equivalent: 140) was added to 80 parts of the thus obtained water dispersion (of which the content of the water-insoluble polymer was 4.0 parts), and further 0.73 part of ion-exchanged water was added thereto. The resultant mixture was stirred at 80° C. for 3 h, thereby obtaining a water dispersion containing the carbon blacks and a crosslinked water-insoluble polymer. The amount of the crosslinking agent used above was 4.6 parts on the basis of 100 parts of the water-insoluble polymer, and the weight-average molecular weight (Mw) of the crosslinked water-insoluble polymer was 300,000. The result of measurement of an average particle size of the particles constituted from the carbon blacks and the crosslinked water-insoluble polymer is shown in Table 3.

(2) Production of Water-Based Ink

The same procedure as in Example 1(2) was repeated except for using the thus obtained water dispersion, thereby producing a water-based ink. The results are shown in Table 3.

Examples 8 to 12

The same procedure as in Example 7 was repeated except for using the carbon blacks, water-insoluble polymer and crosslinking agent as shown in Table 3 in place of those used in Example 7(1), thereby producing water-based inks. The results are shown in Table 3.

Meanwhile, the crosslinking agent used in Example 11 was "DENACOL EX-411" (tradename) (pentaerythritol polyglycidyl ether; available from Nagase ChemteX Corp.; epoxy equivalent: 229).

Comparative Examples 10 TO 12

The same procedure as in Example 7 was repeated except for using the carbon black(s), water-insoluble polymer and crosslinking agent as shown in Table 3 in place of those used in Example 7(1), thereby producing water-based inks. The results are shown in Table 3.

Example 13

The same manner as in Example 7 was repeated except for using the crosslinking group-containing water-insoluble polymer obtained in Production Example 4 in place of the water-insoluble polymer used in Example 7(1), thereby producing a water dispersion. The thus obtained water dispersion was stirred at 80° C. for 3 h without adding any crosslinking agent thereto, thereby obtaining a water dispersion containing carbon blacks and a crosslinked water-insoluble polymer. Further, a water-based ink was produced in the same manner as in Example 7 except for using the thus obtained water dispersion. The results are shown in Table 3.

Comparative Example 13

The same manner as in Example 7 was repeated except for using the crosslinking group-containing water-soluble polymer obtained in Production Example 5 in place of the water-insoluble polymer used in Example 7(1), thereby producing a water dispersion. The thus obtained water dispersion was stirred at 80° C. for 3 h without adding any crosslinking agent thereto, thereby obtaining a water dispersion containing carbon blacks and a crosslinked water-soluble polymer. Further, a water-based ink was produced in the same manner as in Example 7 except for using the thus obtained water dispersion. The results are shown in Table 3.

Example 14 and Comparative Examples 14 to 16

The same procedure as in Example 7 was repeated except for using formulations as shown in Table 3, thereby producing water-based inks. The results are shown in Table 3.

Example 15

The water dispersions obtained in Comparative Examples 10 and 11 were mixed and stirred with each other at a mixing ratio (weight ratio) of the water dispersion obtained in Comparative Example 10 to the water dispersion obtained in Comparative Example 11 of 15:85 in terms of carbon black contents therein, thereby obtaining a mixed water dispersion. The same procedure as in Example 7(2) was repeated except for using the thus obtained mixed water dispersion, thereby obtaining a water-based ink. The results are shown in Table 3.

Example 16

The water dispersions obtained in Comparative Examples 14 and 16 were mixed and stirred with each other at a mixing ratio (weight ratio) of the water dispersion obtained in Comparative Example 14 to the water dispersion obtained in Comparative Example 16 of 85:15 in terms of pigment contents therein, thereby obtaining a mixed water dispersion. The same procedure as in Example 7(2) was repeated except for using the thus obtained mixed water dispersion, thereby obtaining a water-based ink. The results are shown in Table 3.

TABLE 3

|  | Examples | | | | | |
| --- | --- | --- | --- | --- | --- | --- |
|  | 7 | 8 | 9 | 10 | 11 | 12 |
| Production Examples of water-insoluble polymers | Pro. Ex. 2 | Pro. Ex. 3 | Pro. Ex. 1 | Pro. Ex. 2 | Pro. Ex. 2 | Pro. Ex. 2 |
| Carbon black (a) | | | | | | |
| Kind*1 | CB-1 | CB-1 | CB-1 | CB-1 | CB-6 | CB-1 |
| Acid group content (μmol/g) | 0 | 0 | 0 | 0 | 57 | 0 |
| DBP oil absorption (mL/100 g) | 105 | 105 | 105 | 105 | 150 | 105 |
| Carbon black (b) | | | | | | |
| Kind*2 | CB-3 | CB-3 | CB-3 | CB-7 | CB-3 | CB-3 |
| Acid group content (μmol/g) | 645 | 645 | 645 | 280 | 645 | 645 |
| Weight ratio of carbon black (b) to carbon black (a) [(b)/(a)] | 15/85 | 15/85 | 15/85 | 15/85 | 15/85 | 15/85 |

TABLE 3-continued

|  | | | | | | |
|---|---|---|---|---|---|---|
| Difference between acid group contents of carbon blacks (a) and (b): (b) − (a) (μmol/g) | 645 | 645 | 645 | 280 | 588 | 645 |
| Crosslinking agent: Kind*3 | EX-321 | EX-321 | EX-321 | EX-321 | EX-321 | EX-411 |
| Amount of crosslinking agent based on 100 parts of polymer (part) | 4.6 | 4.6 | 4.9 | 4.6 | 4.6 | 7.4 |
| Evaluation results | | | | | | |
| Average particle size (nm) | 113 | 114 | 116 | 113 | 120 | 113 |
| (1) Image density 6200 | 1.34 | 1.33 | 1.30 | 1.30 | 1.32 | 1.34 |
| (2) Fixing property | A | A | A | A | A | A |
| (3) High lighter fastness | A | A | A | A | A | A |
| (4) Image uniformity | A | A | A | A | A | A |
| (5) Ejection reliability (a) | A | A | A | A | A | A |
| (6) Ejection reliability (b) | A | A | A | A | B | A |
| (7) Storage stability (%) | 100 | 100 | 100 | 100 | 110 | 110 |
| (8) Rate of adhesion of polymer (%) | — | — | — | — | — | — |

|  | Comparative Examples | | | Ex. | Com. Ex. |
|---|---|---|---|---|---|
|  | 10 | 11 | 12 | 13 | 13 |
| Production Examples of water-insoluble polymers | Pro. Ex. 2 | Pro. Ex. 2 | Pro. Ex. 2 | Pro. Ex. 4 | Pro. Ex. 5 |
| Carbon black (a) | | | | | |
| Kind*1 | CB-1 | — | CB-6/CB-1 (15/85) | CB-1 | CB-1 |
| Acid group content (μmol/g) | 0 | — | 8.6 | 0 | 0 |
| DBP oil absorption (mL/100 g) | 105 | — | 111.8 | 105 | 105 |
| Carbon black (b) | | | | | |
| Kind*2 | — | CB-3 | — | CB-3 | CB-3 |
| Acid group content (μmol/g) | — | 645 | — | 645 | 645 |
| Weight ratio of carbon black (b) to carbon black (a) [(b)/(a)] | 0/100 | 100/0 | 0/100 | 15/85 | 15/85 |
| Difference between acid group contents of carbon blacks (a) and (b): (b) − (a) (μmol/g) | — | — | — | 645 | 645 |
| Crosslinking agent: Kind*3 | EX-321 | EX-321 | EX-321 | — | — |
| Amount of crosslinking agent based on 100 parts of polymer (part) | 4.6 | 4.6 | 4.6 | — | — |
| Evaluation results | | | | | |
| Average particle size (nm) | 105 | 125 | 114 | 123 | 120 |
| (1) Image density 6200 | 1.15 | 1.33 | 1.16 | 1.34 | 1.28 |
| (2) Fixing property | A | C | A | A | A |
| (3) High lighter fastness | A | C | A | A | B |
| (4) Image uniformity | C | C | C | A | B |
| (5) Ejection reliability (a) | A | C | B | A | B |
| (6) Ejection reliability (b) | A | C | C | B | C |
| (7) Storage stability (%) | 100 | 180 | 115 | 110 | 130 |
| (8) Rate of adhesion of polymer (%) | — | — | — | — | — |

|  | Ex. | Com. Ex. | | Ex. | |
|---|---|---|---|---|---|
|  | 14 | 14 | 15 | 15 | 16 |
| Production Examples of water-insoluble polymers | Pro. Ex. 2 | Pro. Ex. 2 | Pro. Ex. 2 | *4 | *5 |
| Carbon black (a) | | | | | |
| Kind*1 | CB-1 | CB-1 | — | CB-1 | CB-1 |
| Acid group content (μmol/g) | 0 | 0 | — | 0 | 0 |
| DBP oil absorption (mL/100 g) | 105 | 105 | — | 105 | 105 |

TABLE 3-continued

| Carbon black (b) | | | | | | |
|---|---|---|---|---|---|---|
| Kind*[2] | CB-8 | — | CB-8 | CB-8 | CB-3 | CB-8 |
| Acid group content (μmol/g) | 700 | — | 700 | 700 | 645 | 700 |
| Weight ratio of carbon black (b) to carbon black (a) [(b)/(a)] | 15/85 | 0/100 | 100/0 | 100/0 | 15/85 | 15/85 |
| Difference between acid group contents of carbon blacks (a) and (b): (b) − (a) (μmol/g) | 700 | — | — | — | 645 | 700 |
| Crosslinking agent: Kind*[3] | EX-321 | EX-321 | EX-321 | — | EX-321 | EX-321 |
| Amount of crosslinking agent based on 100 parts of polymer (part) | 4.6 | 4.6 | 4.6 | — | 4.6 | 4.6 |
| Evaluation results | | | | | | |
| Average particle size (nm) | 114 | 105 | 116 | 116 | 118 | 115 |
| (1) Image density 6200 | 1.36 | 1.15 | 1.35 | 1.35 | 1.34 | 1.35 |
| (2) Fixing property | A | A | B | C | A | B |
| (3) High lighter fastness | A | A | B | C | B | B |
| (4) Image uniformity | A | C | C | C | A | B |
| (5) Ejection reliability (a) | A | A | B | B | A | A |
| (6) Ejection reliability (b) | A | A | C | C | A | B |
| (7) Storage stability (%) | 100 | 100 | 124 | 100 | 110 | 115 |
| (8) Rate of adhesion of polymer (%) | 89.9 | 88.9 | 88.2 | 0 | — | *[5] |

Note
*[1]CB-1: "MONARCH880" (available from Cabot Corp.)
CB-6: "Colour Black S 160" (available from Degussa AG.)
*[2]CB-3: Self-dispersible carbon black oxidized with peroxodisulfate (DBP oil absorption: 105 mL/100 g)
CB-7: Self-dispersible carbon black oxidized with peroxodisulfate (DBP oil absorption: 105 mL/100 g)
CB-8: Self-dispersible carbon black oxidized with hypochlorite (DBP oil absorption: 117 mL/100 g)
*[3]EX-321: "DENACOL EX-321" available from Nagase ChemteX Corp.
EX-411: "DENACOL EX-411" available from Nagase ChemteX Corp.
Note
*[4](Water dispersion obtained in Comparative Example 10):(Water dispersion obtained in Comparative Example 11) = 85:15 (weight ratio)
*[5](Water dispersion obtained in Comparative Example 14):(Water dispersion obtained in Comparative Example 16) = 85:15 (weight ratio)
(Regarding the rate of adhesion of polymer, refer to respective Comparative Examples)

From Table 3, it was confirmed that the water-based inks obtained in Examples 7 to 16 were excellent in image density, fixing property, high lighter fastness, image uniformity and ejection reliability (a) at room temperature as well as in ejection reliability (b) under high-temperature and low-humidity conditions and storage stability as compared to those obtained in Comparative Examples 10 to 16.

Industrial Applicability

The water-based ink containing the water dispersion of the present invention is excellent in image density when printed on a plain paper, fixing property, high lighter fastness, image uniformity, ejection reliability and storage stability and, therefore, useful as a water-based ink for ink-jet printing.

The invention claimed is:

1. A water dispersion for ink-jet printing which is produced by a process comprising the following steps I and II:
    Step I: dispersing a mixture containing a water-insoluble polymer, carbon black (a) having an acid group content of from 0 to 200 μmol/g, carbon black (b) having an acid group content of more than 200 μmol/g but not more than 1000 μmol/g, an organic solvent and water, in which a difference between acid group contents of the carbon blacks (a) and (b) is from 100 to 1000 μmol/g, to obtain a dispersion; and
    Step II removing the organic solvent from the dispersion obtained in the step I to obtain a water dispersion;
    wherein a weight ratio of the carbon black (a) to the carbon black (b) [carbon black (a)/carbon black (b)] is from 10/90 to 15/85.

2. The water dispersion for ink-jet printing according to claim 1, wherein the process further comprises the following step III:
    Step III: reacting the water dispersion obtained in the step II with a crosslinking agent to obtain a water dispersion containing a crosslinked water-insoluble polymer.

3. The water dispersion for ink-jet printing according claim 1, wherein the carbon black (b) is a self-dispersible carbon black.

4. The water dispersion for ink-jet printing according to claim 1, wherein the carbon black (a) has an acid group content of from 0 to 100 μmol/g.

5. The water dispersion for ink-jet printing according to claim 1, wherein the carbon black (a) has a DBP (dibutyl phthalate) oil absorption of from 20 to 200 mL/100 g.

6. The water dispersion for ink-jet printing according to claim 1, wherein the water-insoluble polymer is a graft polymer comprising a constitutional unit derived from (a) a salt-forming group-containing monomer, a constitutional unit derived from (b) a macromer, and a constitutional unit derived from (c) a monomer containing a straight-chain or branched alkyl group or alkenyl group having 12 to 22 carbon atoms and/or a constitutional unit derived from (d) an aromatic ring-containing monomer.

7. The water dispersion for ink-jet printing according to claim 1, wherein the carbon black (b) has an acid group content of 280 μmol/g and more.

8. The water dispersion for ink-jet printing according to claim 1, wherein the carbon black (b) has an acid group content of 300 μmol/g and more.

9. The water dispersion for ink-jet printing according to claim 7, wherein the difference between acid group contents of the carbon blacks (a) and (b) is 280 μmol/g and more.

10. The water dispersion for ink-jet printing according to claim 1, wherein the difference between acid group contents of the carbon blacks (a) and (b) is 500 μmol/g and more.

11. The water dispersion for ink-jet printing according to claim 1, wherein the carbon black (a) has an acid group content of from 0 to 50 μmol/g.

12. A method for producing a water dispersion for ink-jet printing comprising the following steps I and II:
   Step I: dispersing a mixture containing a water-insoluble polymer, carbon black (a) having an acid group content of from 0 to 200 μmol/g, carbon black (b) having an acid group content of more than 200 μmol/g but not more than 1000 μmol/g, an organic solvent and water, in which a difference between acid group contents of the carbon blacks (a) and (b) is from 100 to 1000 μmol/g, to obtain a dispersion; and
   Step II: removing the organic solvent from the dispersion obtained in the step I to obtain a water dispersion;
   wherein a weight ratio of the carbon black (a) to the carbon black (b) [carbon black (a)/carbon black (b)] is from 10/90 to 15/85.

13. The method for producing a water dispersion for ink-jet printing according to claim 12, wherein the method further comprises the following step III:
   Step III: reacting the water dispersion obtained in the step II with a crosslinking agent to obtain a water dispersion containing a crosslinked water-insoluble polymer.

14. The method for producing a water dispersion for ink-jet printing according to claim 12, wherein the carbon black (b) is a self-dispersible carbon black.

15. The method for producing a water dispersion for ink jet printing according to claim 12, wherein the carbon black (a) has an acid group content of from 0 to 100 μmol/g.

16. The method for producing a water dispersion for ink-jet printing according to claim 12, wherein the carbon black (a) has a DBP (dibutyl phthalate) oil absorption of from 20 to 200 mL/100 g.

17. The method for producing a water dispersion for ink-jet printing according to claim 12, wherein the water-insoluble polymer is a graft polymer comprising a constitutional unit derived from (a) a salt-forming group-containing monomer, a constitutional unit derived from (b) a macromer, and a constitutional unit derived from (c) a monomer containing a straight-chain or branched alkyl group or alkenyl group having 12 to 22 carbon atoms and/or a constitutional unit derived from (d) an aromatic ring-containing monomer.

18. The method for producing a water dispersion for ink-jet printing according to claim 12, wherein the carbon black (b) has an acid group content of 280 μmol/g and more.

19. The method for producing a water dispersion for ink-jet printing according to claim 12, wherein the carbon black (b) has an acid group content of 300 μmol/g and more.

20. The method for producing a water dispersion for ink jet printing according to claim 18, wherein the difference between acid group contents of the carbon blacks (a) and (b) is 280 μmol/g and more.

21. The method for producing a water dispersion for ink-jet printing according to claim 12, wherein the difference between acid group contents of the carbon blacks (a) and (b) is 500 μmol/g and more.

22. The method for producing a water dispersion for ink-jet printing according to claim 12, wherein the carbon black (a) has an acid group content of from 0 to 50 μmol/g.

23. A water-based ink for ink-jet printing comprising the water dispersion for ink-jet printing as defined in claim 1.

* * * * *